US009916627B1

(12) United States Patent
Huang et al.

(10) Patent No.: US 9,916,627 B1
(45) Date of Patent: Mar. 13, 2018

(54) METHODS SYSTEMS AND ARTICLES OF MANUFACTURE FOR PROVIDING TAX DOCUMENT GUIDANCE DURING PREPARATION OF ELECTRONIC TAX RETURN

(71) Applicant: Intuit Inc., Mountain View, CA (US)

(72) Inventors: Nankun Huang, San Diego, CA (US); Carol A. Howe, San Diego, CA (US); Robert E. Bamford, San Diego, CA (US); Christopher M. Dye, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 209 days.

(21) Appl. No.: 14/266,512

(22) Filed: Apr. 30, 2014

(51) Int. Cl.
*G06Q 40/00* (2012.01)
(52) U.S. Cl.
CPC .................. *G06Q 40/123* (2013.12)
(58) Field of Classification Search
CPC ............................ G06Q 40/123; G06Q 20/207
USPC ...................................................... 705/35–45
See application file for complete search history.

(56) References Cited

U.S. PATENT DOCUMENTS

| 5,157,763 | A | 10/1992 | Peters et al. |
| 5,603,027 | A | 2/1997 | Ohkami |
| 5,608,898 | A | 3/1997 | Turpin et al. |
| 5,640,501 | A | 6/1997 | Turpin |
| 5,740,405 | A | 4/1998 | DegGraaf |
| 5,745,712 | A | 4/1998 | Turpin et al. |
| 6,662,186 | B1 | 12/2003 | Esquibel et al. |
| 7,076,491 | B2 | 7/2006 | Tsao |
| 7,134,092 | B2 | 11/2006 | Fung et al. |
| 7,266,595 | B1 | 9/2007 | Black et al. |
| 7,747,484 | B2 | 6/2010 | Stanley et al. |
| 7,752,092 | B1 * | 7/2010 | Mattice .................. G06Q 10/00 705/342 |
| 7,860,763 | B1 | 12/2010 | Quinn et al. |
| 7,908,567 | B1 | 3/2011 | Bhojan |
| 8,156,018 | B1 | 4/2012 | Quinn et al. |
| 8,675,923 | B2 | 3/2014 | Snow et al. |
| 2003/0036912 | A1 | 2/2003 | Sobotta et al. |
| 2003/0061131 | A1 | 3/2003 | Parkan |
| 2003/0130999 | A1 | 7/2003 | Probert et al. |

(Continued)

FOREIGN PATENT DOCUMENTS

| JP | 2003006556 A | 1/2003 |
| JP | 2004145663 A | 5/2004 |

(Continued)

OTHER PUBLICATIONS

PCT International Search Report dated Nov. 27, 2013 in International Application No. PCT/US2013/040628 filed May 10, 2013, Form ISA 220 and 210, (5 pages).

(Continued)

*Primary Examiner* — Chia-Yi Liu
(74) *Attorney, Agent, or Firm* — Vista IP Law Group LLP

(57) ABSTRACT

Computer-implemented methods, systems and computer program products for directing a current user of a tax preparation application to a portion of the current user's tax document. Images of tax documents of other or prior users are received, and a tax document image is selected. Tax data within the selected tax document image is redacted from the image to generate an image of a template of a tax document. Sections or interface elements of interview screens generated by the tax preparation program are mapped to sections of the template. When the current user selects an interface element such as a field, a pre-determined or selected portion of the template image is presented through the tax preparation application to the current user. The particular field mapped to the particular selected interface element may be identified or highlighted.

29 Claims, 30 Drawing Sheets

(56) References Cited

U.S. PATENT DOCUMENTS

| | | |
|---|---|---|
| 2003/0202012 A1 | 10/2003 | Kemp |
| 2004/0066411 A1 | 4/2004 | Fung et al. |
| 2005/0010780 A1 | 1/2005 | Kane et al. |
| 2006/0075398 A1 | 4/2006 | Bennett et al. |
| 2006/0155632 A1 | 7/2006 | Cherkas et al. |
| 2006/0178961 A1 | 8/2006 | Stanley et al. |
| 2006/0218541 A1 | 9/2006 | Saito |
| 2006/0271451 A1 | 11/2006 | Varughese |
| 2007/0033117 A1 | 2/2007 | Murray |
| 2007/0033118 A1 | 2/2007 | Hopkinson |
| 2008/0319882 A1 | 12/2008 | Wyle |
| 2009/0150169 A1* | 6/2009 | Kirkwood .............. G06Q 10/00 705/342 |
| 2009/0228380 A1 | 9/2009 | Evanitsky |
| 2010/0191460 A1 | 6/2010 | Vroom et al. |
| 2012/0194837 A1 | 8/2012 | Kamata |
| 2012/0215669 A1 | 8/2012 | Lieberman et al. |
| 2013/0036347 A1 | 2/2013 | Eftekhari |

FOREIGN PATENT DOCUMENTS

| | | |
|---|---|---|
| JP | 2006133933 A | 5/2006 |
| JP | 2010128964 A | 6/2010 |
| KR | 100883390 B1 | 2/2009 |
| KR | 1020090064267 A | 6/2009 |
| WO | 2012137214 A1 | 10/2012 |

OTHER PUBLICATIONS

PCT Written Opinion dated Nov. 27, 2013 in International Application No. PCT/US2013/040628 filed May 10, 2013, Form ISA 237, (7 pages).
PCT International Search Report dated Nov. 22, 2013 in International Application No. PCT/US2013/040647 filed May 10, 2013, Form ISA 220 and 210, (5 pages).
PCT Written Opinion dated Nov. 22, 2013 in International Application No. PCT/US2013/040647 filed May 10, 2013, Form ISA 237, (8 pages).
PCT International Search Report dated Dec. 19, 2013 in International Application No. PCT/US2013/040620 filed May 10, 2013, Form ISA 220 and 210, (6 pages).
PCT Written Opinion dated Dec. 19, 2013 in International Application No. PCT/US2013/040620 filed May 10, 2013, Form ISA 237, (13 pages).
https://turbotax.intuit.com/snaptax/mobile/, printed Apr. 30, 2014 (4 pages).
http://en.wikipedia.org/wiki/Mouseover, printed Apr. 30, 2014 (2 pages).
https://www.turbotax.com, printed Apr. 30, 2014 (7 pages).
Office Action dated Feb. 4, 2014 in U.S. Appl. No. 13/781,571, filed Feb. 28, 2013, (14 pages).
http://support.google.com/drive/bin/answer.py?hl=en&answer=176692, Mar. 18, 2013 (2 pages).
http://www.freewaregenius.com/how-to-extract-text-from-images-a-comparison-of-free-ocr-tools/, Mar. 18, 2013 (16 pages).
http://www.nuance.com/for-individuals/by-product/omnipage/index.htm, Mar. 18, 2013 (2 pages).
http://www.miteksystems.com/, Mar. 18, 2013 (3 pages).
http://www.abbyy.com/solutions/mobile/, Mar. 18, 2013 (1 page).
http://blog.turbotax.intuit.com/2011/01/14/taxes-on-your-mobile-phone-it%E2%80%99s-a-snap/, Mar. 18, 2013 (2 pages).
http://oauth.net/, Mar. 18, 2013 (1 page).
http://en.wikipedia.org/wiki/OAuth, Mar. 18, 2013 (9 pages).
Bruno, Teri. (Oct. 18) BT&T Consumer Technology launches Taxdollars 1995. Business Wire, (1) 1. Retrieved Feb. 26, 2010, from Business Dateline.
Reigstad, Maryanne, (Jan. 1986). Area Professionals Mobilize to Handle Annual Tax Crunch. Business First: s1, 2(13), 21, Retrieved Feb. 26, 2010, from Business Dateline.

\* cited by examiner

"Split" Configuration

"Split" Configuration

METHODS SYSTEMS AND ARTICLES OF MANUFACTURE FOR PROVIDING TAX DOCUMENT GUIDANCE DURING PREPARATION OF ELECTRONIC TAX RETURN

SUMMARY

Embodiments are directed to presenting an image of a tax document or pre-determined portion thereof to a user of a tax preparation application during preparation of an electronic tax return to direct the user to the portion of the user's own paper or electronic tax document to be reviewed or containing tax data to be entered into a field of the electronic tax return.

Certain embodiments are directed to providing real-time tax document guidance to users of tax preparation applications, one example of which includes TURBOTAX tax preparation application, such as turbotax.com. Embodiments present users of the tax preparation application with an image of a tax document or portion thereof, from which tax data has been redacted, to show the user where in their own tax document the user should look for their own tax data to be entered into a particular field of an interview screen or electronic tax return generated by the tax preparation application.

Embodiments are also directed to user-driven, on-demand tax form guidance during preparation electronic tax return, and tax form guidance that is dynamic or changes as the user navigates interview screens and fields thereof generated by the tax preparation application.

Certain embodiments involve selecting a portion or segment of an image of redacted tax document (e.g., by cropping selected portions of an image of a tax document template) and presenting that selected portion or segment to the user. Other embodiments involve presenting an entire image of the template to the user. A particular field within the template or portion thereof may be highlighted or specifically identified to direct users to a specific section of an imaged tax document or template.

Embodiments are also directed to determining which portion or segment of an image of a tax document from which tax data has been redacted should be selected or cropped for presentation to a user of a tax preparation application, or which portion of a tax document template to point to, identify or highlight.

Embodiments are also directed to aggregating images of tax documents containing respective tax data of respective different users of a tax preparation application at an intermediate computer, redacting tax data therefrom, and providing a tax document template in the form of a redacted tax document image to a current user of the tax preparation application. Images of tax documents may be aggregated from multiple sources and multiple types of sources. Tax document images may be processed by determining which tax document images are to be utilized for user guidance, mapping fields of interview screens to fields within the image of a selected tax document image, sanitizing, deleting, masking or redacting tax data from the tax document image or selected or cropped portion thereof, and associating an identification data with processed images and storing to a data store such that the resulting redacted image can be retrieved or identified using the identification data.

Embodiments are also directed to utilizing images of tax documents acquired by a first, prior user of a tax preparation application executing on or accessed by the first user's mobile communication device, (e.g., snaptax.com available from Intuit Inc.), and utilizing images received from the mobile communication device to direct a different, second and current user of a tax preparation application to a location within the second user's tax document. Before being presented to the second user, tax data of the prior user within the image received from the mobile communication device is redacted from the image.

Embodiments are also directed to determining which image of a tax document to select for redaction and use in guiding users of tax preparation applications, e.g., by analyzing image or optical properties of received images, comparing optical properties, and selecting a tax document image to be processed based at least in part upon a comparison.

Embodiments are also directed to mapping interview screen fields and fields of a redacted tax document image in order to determine which portion of the redacted tax document image should be presented to a user of a tax preparation application. For this purpose, embodiments may utilize one or more of dimensions, locations and relative positions of fields within interview screens of a tax preparation application and one or more of dimensions, locations and relative positions of fields within images of tax documents One embodiment is directed to a computer-implemented method for providing guidance to a user of a tax preparation application operable to prepare an electronic tax return or directing a user of a tax preparation application operable to prepare an electronic tax return to a portion of a tax document of the user and comprises receiving a first image of a first tax document, the first image comprising tax data of a first user of the tax preparation application. The method further comprises transforming the first image into a first template of the first tax document by redacting tax data from the first image. The method further comprises receiving a first request by a second user of the tax preparation different from the first user. The first request is based at least in part upon the second user selecting a first interface element of a first interview screen generated by the tax preparation application and corresponding to or associated with a tax document template image or portion thereof, and presenting a first portion of the first template to the second user in response to the first request.

A further embodiment is directed to computer-implemented method for providing guidance to a user of a tax preparation application operable to prepare an electronic tax return or directing a user of a tax preparation application to a portion of a tax document of the user and comprises receiving a template of a tax document, wherein the template does not include tax data of a user of the tax preparation application, or the user's personal or sensitive data has been redacted. The method further comprises receiving a first request by the user of the tax preparation, the request being based at least in part upon the user selecting an interface element of an interview screen generated by the tax preparation application, and presenting a portion of the template to the user in response to the request.

Another embodiment is directed to processing images of tax documents of prior users of a tax preparation application for use in guiding a current user of the tax preparation application. The method comprises receiving respective images of respective different types and/or from different sources (e.g., a wage and tax statement, a dividend or interest statement) of tax documents from respective sources, and for each type, selecting a tax document image. Thus, for example, an image is selected from multiple images of Form W2 for an employer, Intuit Inc., an image is selected from multiple images of Form W2 for another employer, Google Inc. The selected images are processed, which may involve redacting tax data from the selected images to generate respective templates, mapping respective interface elements of respective interview screens generated by the tax preparation application to respective portions of respective templates, assigning template respective identifiers, and storing the templates that do not contain tax data to a data store with associated mapping and identifiers.

Embodiments are also directed to articles of manufacture or computer program products comprising a non-transitory computer readable medium embodying instructions which, when executed by a computer, execute a process for providing guidance to a user of a tax preparation application operable to prepare an electronic tax return or directing a user of a tax preparation application to a portion of a tax document of the user. Other embodiments are directed to articles of manufacture or computer program products for determining which image of plurality of images of a tax document should be utilized, and processing the image in preparation for presentation to a user.

Other embodiments are directed to systems configured or operable to provide guidance to a user of a tax preparation application operable to prepare an electronic tax return. Other embodiments are directed to systems configured or operable to determine which image of plurality of images of a tax document should be utilized, and processing the image in preparation for presentation to a user. Systems may involve or comprise one or more of an intermediate computer that receives tax document images from one or more sources, and is configured or operable to perform processing thereon including one or more of mapping interview screen fields to fields within an image of a tax document, sanitizing, deleting or redacting tax data from tax document images, e.g., such that tax data of users that provided images is not displayed to other users of the tax preparation application, and a current user is instead presented with an image of a tax document template derived or generated from the image of someone else's tax document.

In a single or multiple embodiments, an interface element selected by a user is a fillable field of the first interview screen, which can be populated with tax return data. An interface element such as a fillable field can be selected by the second user (e.g., when a different, first user provided a tax document image processed according to embodiments) manipulating a computer mouse to position a pointer generated by the computer mouse over the first interface element or to click on the first interface element. Interface element selection may also involve input devices such as a keyboard, touchscreen or voice.

In a single or multiple embodiments, the tax document that is imaged and used to generate a tax document template by redacting tax data may be a printed tax document of the first or prior user, such as a wage and tax statement (e.g., Form W2) or other tax document, such as those issued by financial institutions or other sources. Images of tax documents may be generated by an imaging device such as a camera, which may be part of a mobile communication device, e.g., if the first or prior user utilized a mobile tax preparation application such as SNAPTAX tax preparation application, or from another source such as a second or current user's employer (in the case of Form W2) or a tax authority.

In a single or multiple embodiments in which multiple users have submitted images of their tax documents, one of the received tax documents can be selected based on a comparison involving an image or optical attribute of the images, e.g., selection of an image with the best or pre-determined minimum brightness, contrast, clarity or noise, alignment and/or histogram data. The selected image, which contains tax data of a user of the tax preparation application, is transformed template of the tax document. For example, if a first template is already being used, but a second template is determined to be a higher quality template, then the second template can replace the first template, and the second template is then utilized. The second template can then be compared with other templates and replaced as necessary if another template has better optical attributes. Otherwise, if the second template is satisfactory or satisfies pre-determined criteria, further comparisons may not be needed.

In a single or multiple embodiments, tax data of a tax document image is redacted utilizing an optical recognition process, which identifies features of a tax document (such as field borders) and tax data therein. Tax data within a recognized field or segment of the tax document image is deleted or masked to generate a template image. Redaction of tax data may be performed on-the-fly or in real-time during preparation of an electronic tax return in response to the second or current selecting the first interface element, or in other embodiments, redaction is performed before the second or current user has selected first interface element such that the selected or cropped portion of the tax template is then retrieved from a data store and presented to the second or current user in response to selected in of the first interface element.

In a single or multiple embodiments, the selected or pre-determined segment of the tax document template image is or includes a single field associated with the first interface element. In other embodiments, in order to provide a frame of reference or context regarding the location of the field within the user's tax document associated with a selected interface element, the selected or pre-determined segment is or includes a plurality of fields of the tax template image. The plurality of fields includes the imaged field associated with the selected interface element one or more adjacent fields to provide context and reference. The field or the group or plurality of fields that is to be presented may be mapped to respective fields of respective interview screens to respective portions of the first template and stored to a data store such that when an interface element is selected, the data store is accessed and the portion of the tax document template including gone or multiple fields of the template is retrieved and presented to the current user.

As the user manipulates an input element and navigates to different interface elements within an interview screen and different interview screens, different portions of the tax document template or another tax document template as appropriate are identified and presented to the user. Having been presented with a tax document template or portion thereof indicating where in the user's own document (e.g. paper or .pdf version) the current user can look at the identified location within his or her own document for data to be entered into the selected field of the interview screen or electronic tax return (e.g., by manual entry or other method). After fields have been populated and the electronic tax return has been completed, the electronic tax return can be filed with a computer of a tax authority or printed and filed by mail.

In a single or multiple embodiments, the first portion of the tax template that is displayed in response to the selection of an input element overlays or covers at least a portion of the displayed interview screen. According to one embodiment, this may involve overlaying or covering one or more interface elements within the interview screen other than the interface element that was selected to trigger display of the portion. The tax template portion may also be displayed in a split view within a single display or split screen (e.g. if multiple display monitors are utilized) configuration such that no interface element of the interview screen is covered by a displayed template portion.

In a single or multiple embodiments, an interface element of an interview screen is linked or mapped to, or associated with, a tax document template or a portion thereof. If necessary, template identification data may be used to identify the tax document template or portion thereof that is to be utilized. For example, identification data may be received from the user or determined from other data already entered into the electronic tax return (e.g., an employer name or other identifier), and this data is used to select a tax template from a plurality of tax templates in a data store, and a portion of the selected tax template may then be selected or cropped for presentation to the second or current user.

In a single or multiple embodiments, the tax preparation application is an online tax preparation application (such as turbotax.com) accessible by a browser executing on a computing device of a second user other than a first user that provided a tax document image. A data store and associated components that perform image selection, redaction and mapping may reside on the same computer hosting the online tax preparation application or on another computer accessible thereby. Embodiments may also be implemented in or involve desktop versions and mobile versions of tax preparation applications.

In a single or multiple embodiments, the image of the first user's tax document that is transformed or redacted to form a tax document template is from a prior tax year, such as the previous tax year if the prior year template configuration remains accurate, and the second user is utilizing the tax preparation application to prepare an electronic tax return for a current tax year. In other embodiments, the first user may be another user of the tax preparation application for a current year, such that the image of the first user's tax document that is transformed or redacted to form a tax document template is from the same tax year as the tax year for which the second or current user is preparing an electronic tax return. In other embodiments, the first or current user may be preparing an amended return, and the tax document template presented a template of a prior year.

BRIEF DESCRIPTION OF THE DRAWINGS

FIG. 12 illustrates an example of how structures or features of a tax document image or template thereof can be identified by use of a coordinate system;

FIG. 15 illustrates an example of how segments of a tax document image or template thereof can be identified by use of a coordinate system for use in mapping between an interview screen and the image or template;

FIGS. 20A-H are screen shots showing how selected segments of a tax document image or template image are presented to a user through a tax preparation application during preparation of an electronic tax return as the user navigates or selects fields of the interview screen and enters tax data from the user's own tax document.

DETAILED DESCRIPTION OF ILLUSTRATED EMBODIMENTS

Embodiments are directed to presenting a selected or determined portion of an image of a tax document, from which some or all user tax data may be redacted, such that the image portion presented is a portion of a template or image of a redacted tax document. The template is presented to a user of a tax preparation application during preparation of an electronic tax return as a user navigates or selects different boxes or fields of interview screens generated by the tax preparation application. In response to the user's selection of a box or field of an interview screen, respective portions of the template or redacted tax document image are displayed to the user to allow the user to view the displayed portion as a reference to a location within the user's own tax document that is the subject of the electronic tax return being prepared. Thus, embodiments guide or advise the user where to look in their own tax document for tax data, which is then entered into the box or field of the interview screen generated by the tax preparation application to prepare the electronic tax return.

Figure 1:
FIG. 1 depicts an interview screen generated by a tax preparation application according to one embodiment and showing how embodiments guide a user to a portion of a tax document to identify tax data to input into a selected field of the interview screen a field.
Figure 2:
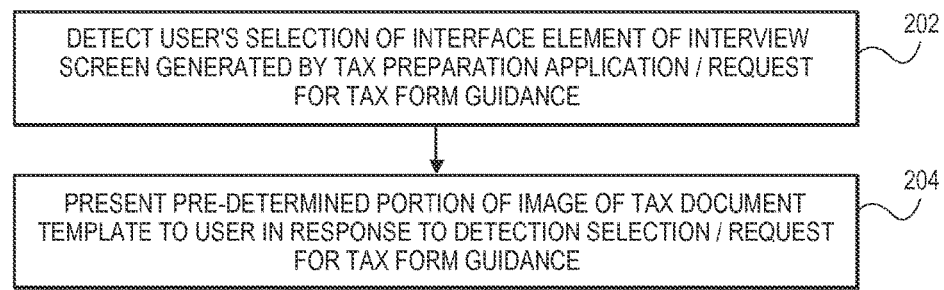
FIG. 2 is a flow diagram of how embodiments guide a user to a portion of a tax document to identify tax data to input into a selected field of the interview screen a field.
Figure 3:
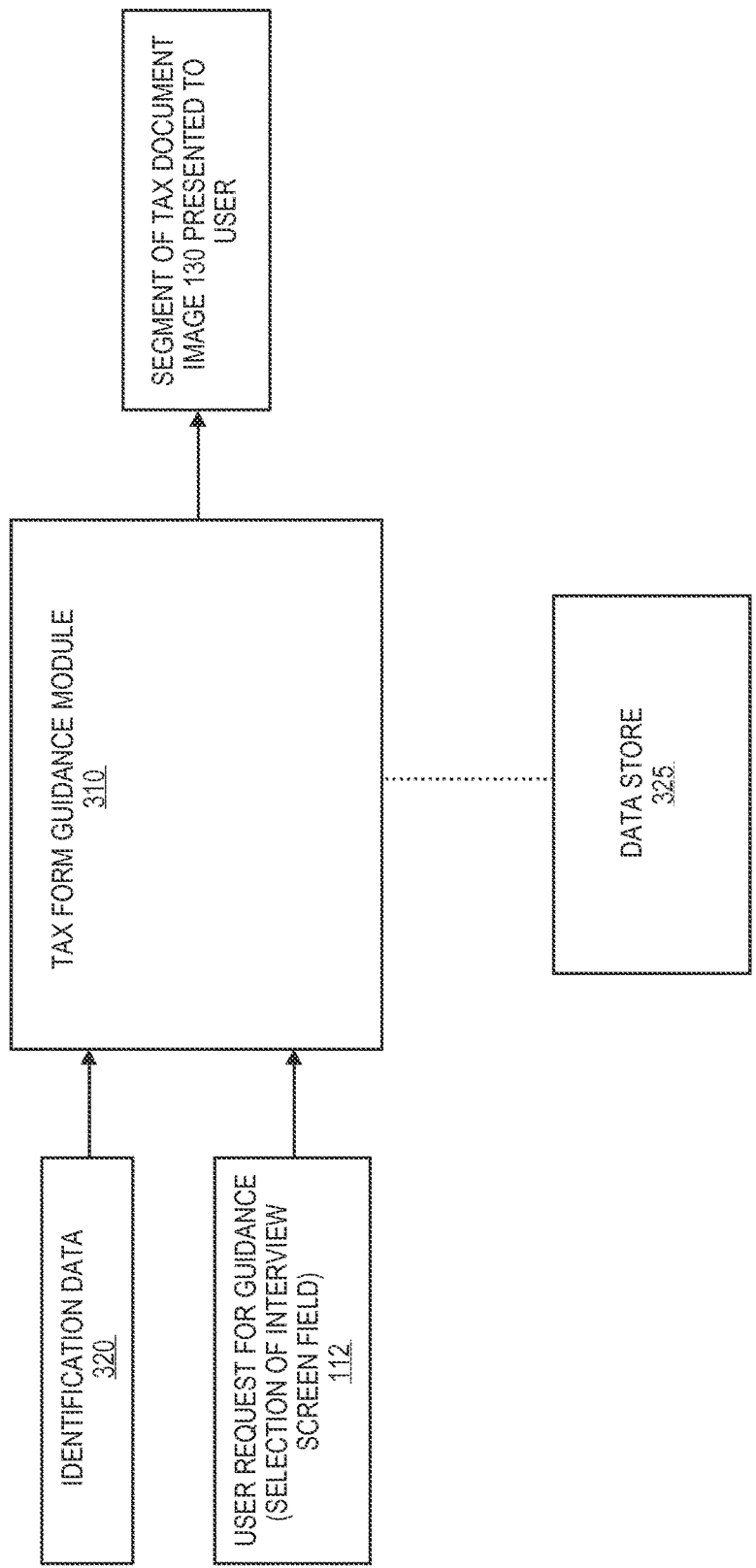
FIG. 3 is a block diagram of a system constructed according to one embodiment and configured to provide tax document guidance to a user during preparation of an electronic tax return.

The assistance or guidance to users of a tax preparation application as provided by embodiments enhances user confidence that the correct data within the user's own tax document has been identified for entry into a field of an interview screen. This may be beneficial to users that are not familiar with tax forms, particularly when tax forms are changed or updated, first time or inexperienced users of the tax preparation application, and users that transition from having taxes prepared by tax professionals to preparing their own electronic tax returns with a tax preparation application or transitioning from one tax preparation application to another tax preparation application. FIGS. 1-3 illustrate one example of how embodiments may be implemented.

Referring to FIG. 1, an interview screen 110 generated by the tax preparation application such as TURBOTAX tax preparation application, is displayed on a screen of the user's computing device. TURBOTAX is a registered trademark of Intuit Inc., Mountain View, Calif. The interview screen 110 includes a menu 113 and an arrangement of fields or boxes 112 for the selected menu item 113s ("s" referring to "selected" menu item). The fields or boxes 112 can be populated with tax data 111. Tax data 111 may, for example, be entered manually by the user typing in the data or imported into a field 112 from an electronic file such as from a file of QUICKEN financial management system.

In the illustrated embodiment involving a wage and tax statement such as Form W-2, the interview screen 110 includes a field 112a for "1—Wages" that has been populated with tax data 111a "$50,000," and the user has manipulated a computer mouse such that the mouse pointer 122 generated thereby is positioned or hovers over a field 112b. In the illustrated embodiment, this indicates the user's selection of the field 112b, or the user's request for invocation of tax form guidance according to embodiments. In the illustrated embodiment, while selection of a field 112b is by a pointer 122 of a mouse hovering over a field 112, another input device or method may be utilized for this purpose such as the user utilizing a keyboard device to select or tab over to the field 112b or by pressing a pre-determined key, by using the mouse to click on the field 112b, and voice command or voice recognition (e.g., by the user speaking "guide me" to a tax preparation application configured for voice recognition). Accordingly, it will be understood that FIG. 1 is provided as one manner of implementing embodiments.

With continuing reference to FIG. 1, and with further reference to FIGS. 2-3, in a method 200 executed by a computerized tax form guidance module 310 (generally, "guidance module" 310) constructed or programmed according to one embodiment, at 202, the user selects an interface element such as field 112b shown in FIG. 1 as described above using an input device. The guidance module 310 detects this selection or request for guidance, and in response, at 204, identifies or selects an image of a tax document template, or a portion 130 thereof, stored in a data store or database 325 (generally, data store). Certain embodiments may involve displaying the entire image of the tax document template, whereas other embodiments, e.g., as described with reference to FIG. 1, show how a portion 130 thereof. Further, the portion 130 may be pre-determined and retrieved from the data store 325, or the guidance module 310 may select or determine the portion 130 in response to receiving the user's guidance request. The guidance module 310 presents the template or portion 130 to the user through the tax preparation application.

As shown in FIG. 3, identification or selection of the portion of the tax document template image may involve the guidance module 310 receiving or determining identification data 320 that is used to retrieve or select the portion 130. With the example of Form W-2 provided to the user by the user's employer, the identification data 320 may be an employer identification (ER ID) (such as an alpha-numeric employer identifier or code, employer name, etc.). The identification data 320 may also be determined from tax data 111 already be entered in a pre-determined field 112 of an interview screen 110, or that is provided by the user in response to a request generated by the guidance module 310. The guidance module 310 searches the data store 325 for images and identifies selects or determines the portion 130 for that employer based at least in part upon the identification data 320. The portion 130 is then presented to the user in response to the user's guidance request as generally illustrated in FIG. 1.

In the embodiment illustrated in FIG. 1, the portion 130 of the tax document template image includes a plurality of segments or smaller portions 131 (generally segment) including respective segments of imaged fields of a tax document. In the illustrated embodiment, at least one segment 131h is highlighted ("h" referring to "highlighted") or distinguished from other segments 131 to indicate to the user that that the field of the user's tax document corresponding to the displayed, highlighted segment 131h ("h" referring to "highlighted") is the field containing the corresponding tax data, and other the segments 131 surrounding or adjacent to the highlighted portion 131h may be used to provide further reference to a user and indicate to the user the relative location of the field in the user's own tax document corresponding to the highlighted segment 131h and other segments 131.

In the embodiment illustrated in FIG. 1, the pre-determined portion 130 of the tax document template image includes six segments 131, generally defined by the field structure of the imaged document, and at least one highlighted segment 131h is marked or otherwise identified or distinguished from the other segments 131. This highlighted segment 131h is associated with the particular field 112b selected by the user with the mouse pointer 122. As shown in FIG. 1, the portion 130 may be laid over parts or fields 112 of the interview screen 110 or displayed along a side thereof. Thus, the image of the portion 130 guides the user to a location in the user's own tax document, e.g., a printed a paper tax document, a .pdf copy thereof or a separate image thereof, by providing a visual indication to direct the user to a location in the user's actual tax document for tax data tax data 111b that will be entered into selected field 112b, while also providing context of that location with reference to the other segments 131 within the portion 130.

Thus, the portion 130 of the template or tax document image that is displayed is separate and independent of programmed fields or boxes 112 of the interview screen 110 such that the highlighted segment 131*h* and other adjacent or neighboring segments 131 are presented to the user. This provides the user with a point of reference, context, or an indication of the location within the user's own tax document, thus reducing the amount of work required by the user to locate the field within the user's tax document that corresponds to field 112*b* of the interview screen 110 and contains tax data 111*b* for that interview screen field 112*b*. By displaying other segments 131, embodiments allow the user to see the relative location of the highlighted segment 131*h*, and thus, the relative location of the same field within their actual tax document relative to those other fields in the actual tax document, thereby directing the user to a more focused area within his or her own tax document such that the pertinent tax data can be located more easily and quickly.

This process is repeated for other fields 112 or each field 112 of interview screens 110 associated with a portion 130 of a tax document template image. Thus, the user's selection of a field 112 and presentation of a portions 130 may be repeated as the user selects different boxes or fields 112 of the interview screen 110 or other interview screens 110, such that the portion 130 and highlighted segment 131*h* selected for presentation to the user change as the user selects different fields 112 of an interview screen 110 and fields 112 within different interview screens 110.

Figure 4A:
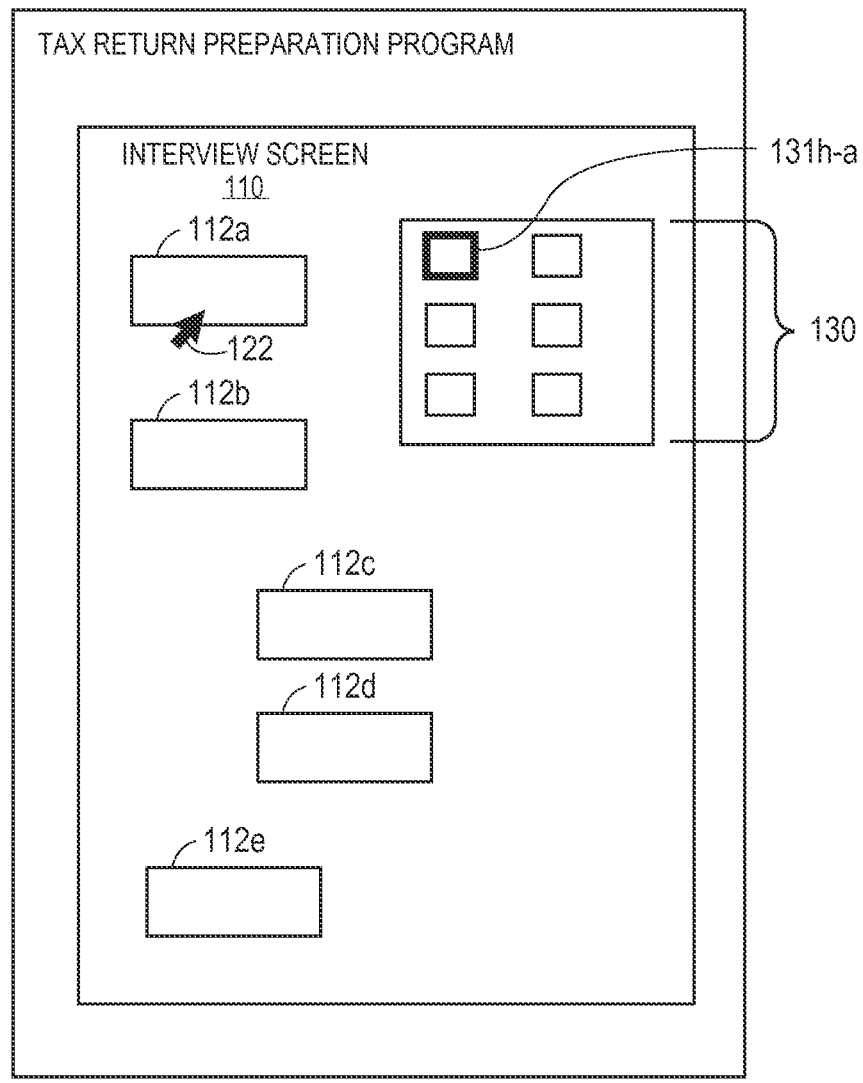
FIGS. 4A-C illustrate how different segments of a portion of a tax document template can be highlighted to guide the user to a particular field of his or her own tax document according to one embodiment.
Figure 4B:
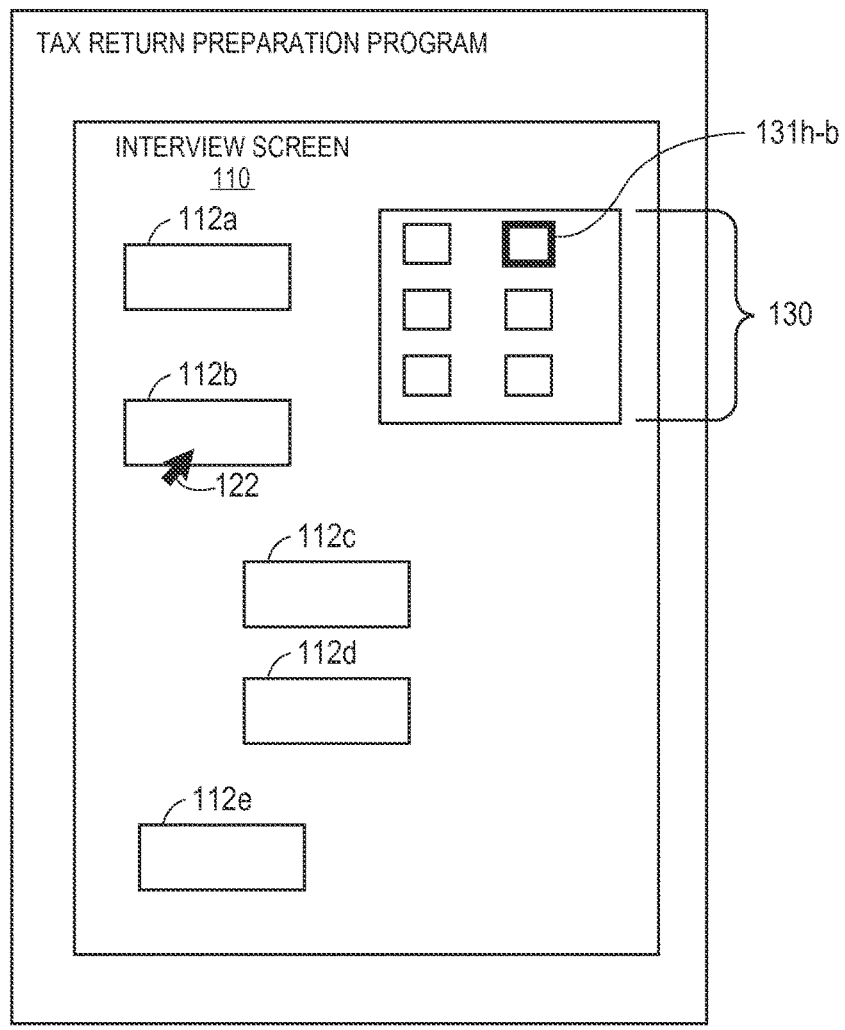
Figure 4C:
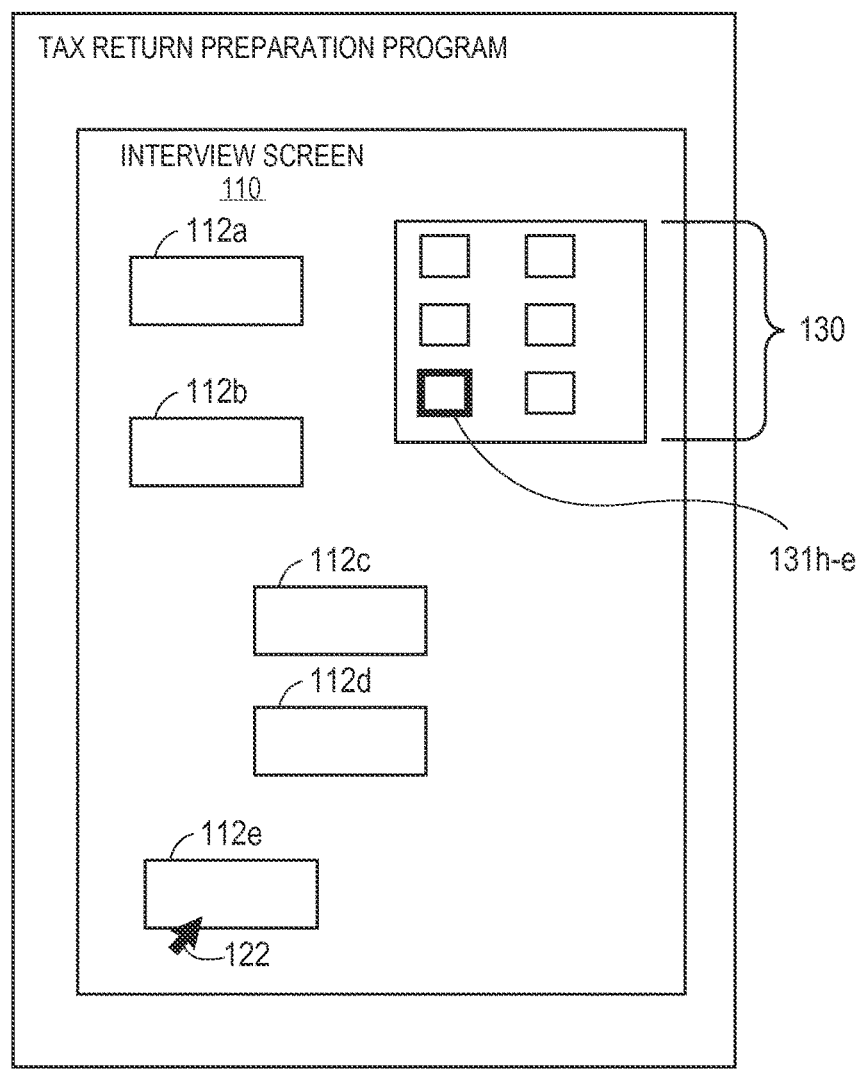

For example, referring to FIG. 4A, the user selects a first field 112*a* of an interview screen 110, and in response, the guidance module 330 selects or generates a first portion 130*a* of an image of a tax document template including a highlighted segment 131*h*-1 and other adjacent or neighboring fields 131. Referring to FIG. 4B, the user selects a second field 112*b* of the same interview screen 110, and in response the guidance module 330 selects or generates a portion 130*b* of the image of the tax document template including a highlighted segment 131*h*-2 and other adjacent or neighboring segments 131. Referring to FIG. 4C, the user selects a third field 112*c* of the interview screen 110, and in response, the guidance module 330 selects or generates a third portion 130*c* of the tax document template image including a highlighted segments 131*h*-3 and other adjacent or neighboring fields 131, and so on for other fields of that interview screen and other interview screens, and for fields of other interview screens 110.

According to one embodiment, the portions 130*a*-*c* may be the same (and thus the same size) but include different highlighted segments 131*h*1-3, e.g., when the fields are located adjacent to or in proximity to each other such that the same portion includes all of the highlighted segments 131*h*-1-3. In other embodiments, the highlighted segments 131*h* may be in different sections of a tax document such that the portions 130*a*-*c* that are presented to the user may be different shapes and/or sizes or involve a different part of a tax document image. Thus, FIGS. 4A-C are provided to generally illustrate how embodiments may be implemented.

Figure 5:
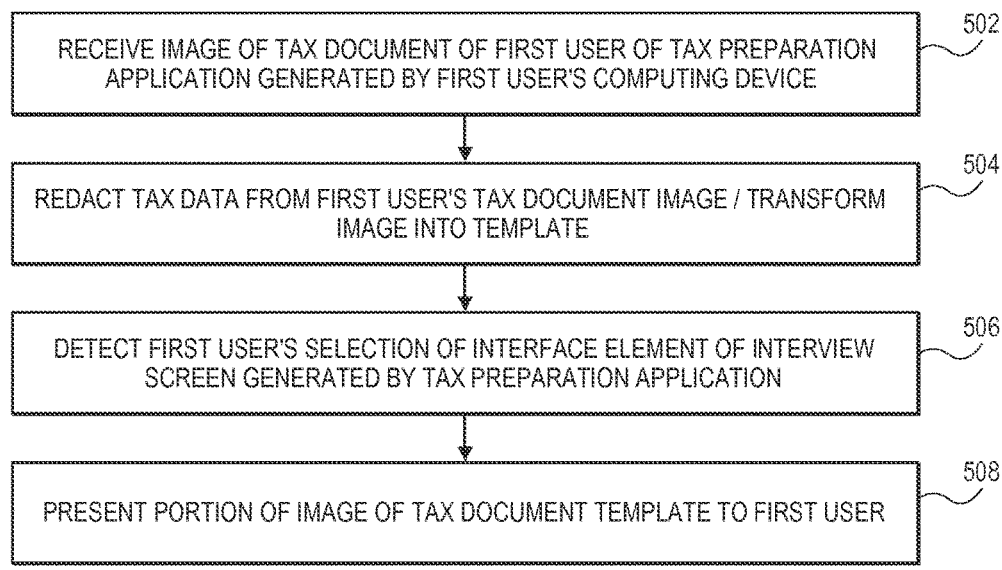
FIG. 5 is a flow diagram illustrating a method of processing images of a current user of a tax preparation application and provided by the current user according to one embodiment.

Referring to FIG. 5, according to one embodiment, the user's own tax document is imaged and processed. When the embodiment of FIG. 5 is utilized, the image of the user's tax document can be processed by the guidance module 310 to redact the user's tax data from the image (e.g., if selected by the user), and the template or redacted image, or a portion 130 thereof, is presented to the user (e.g., as shown in FIG. 1).

Thus, in one embodiment, at 502, an image of the user's tax document is received by the guidance module 310 by the user acquiring an image using a webcam or by use of a smartphone, tablet or other device including an imaging component. At 504, according to one embodiment, the guidance module 310 processes the image to remove or redact the user's tax data from the image, thus transforming the image of the user's tax document into a template. At 506, the user's manipulation of an input device and selection 122 of an interface element or field 112 of an interview screen 110 generated by tax preparation application is detected by the guidance module 310, and at 508, in response, a portion 130 of the template derived from the image of the user's tax document is retrieved or selected and then displayed to the user. At least one segment 131*h* can be highlighted. Thus, the portion 130 of the template image may be derived from the user's own tax document and then presented to the user. The user's tax document template image, which may not include any tax data of the user, or from which selected or predetermined personal or more sensitive data has been redacted, may also be utilized by the guidance module 310 to provide guidance to other users of the tax preparation application.

Figure 6:
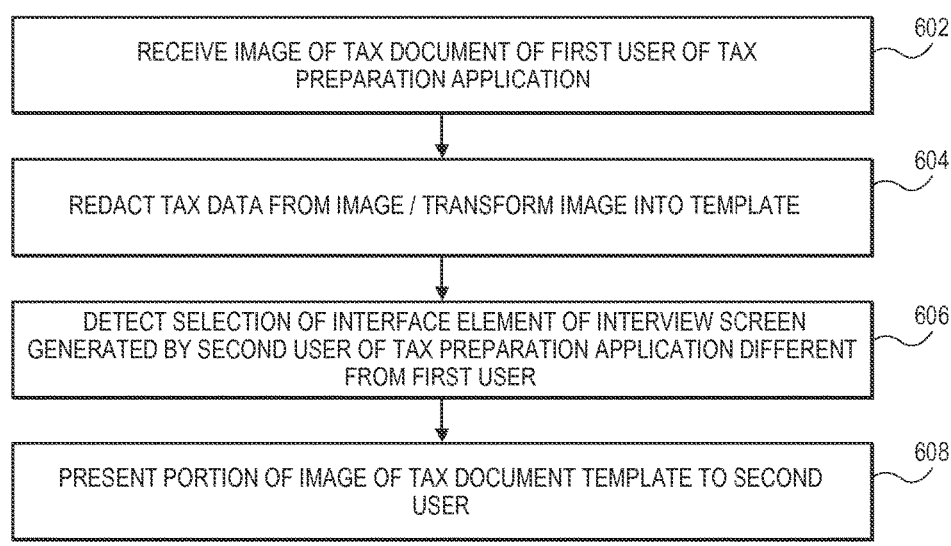
FIG. 6 is a flow diagram illustrating a method of processing images provided by a user other than the current user of a tax preparation application and presenting a processed image of the other user to the current user according to one embodiment.

For example, referring to FIG. 6, according to another embodiment, a current, second user is preparing an electronic tax return, and a tax document of a different, prior or first user is imaged and processed by the guidance module 310. As shown in FIG. 1, some or all of the prior or first user's tax data can be redacted from the portion 130 of the template image by the guidance module 310. Thus, at 602, the guidance module 310 receives an image of the prior or first user's tax document by the first user acquiring an image using a webcam or by use of a smartphone, tablet or other device including an imaging component, and at 604, the guidance module 310 processes the image of the first user's tax document to remove or redact the first user's tax data 111 from the image. The tax document image of the other or first user's tax document is transformed into a template. At 606, the guidance module 310 detects selection of the second or current user's selection of an interface element 112 of an interview screen 110 generated by the tax preparation application. At 608, in response, the guidance module 310 displays a determined or selected portion 130 of the template image derived from the image of the first user's tax document to the second user, and at least one section of the portion is highlighted 131*h*.

In other embodiments, when the user images his or her own tax document and would like tax document guidance, but not to have the user's tax document used for to provide guidance to other users, the user's tax document can be imaged, but it is not necessary to redact the user's tax data 111. Thus, a portion 130 of the image can be determined or selected for presentation to the user. While such embodiments may be utilized for when the user is imaging his or her own document, and the user's tax document will not be processed for presentation to other users, but such users may their submit tax document images to the guidance module 310 for processing according to embodiments (e.g., by granting permission or authorizing the guidance module 310). In these cases, tax data 111 from the image of the user's tax document is redacted or removed such that tax data 111 of the user is not shared with other users.

Aspects of embodiments and different ways in which embodiments may be implemented are described in further detail with reference to FIGS. 7-21.

Figure 7:
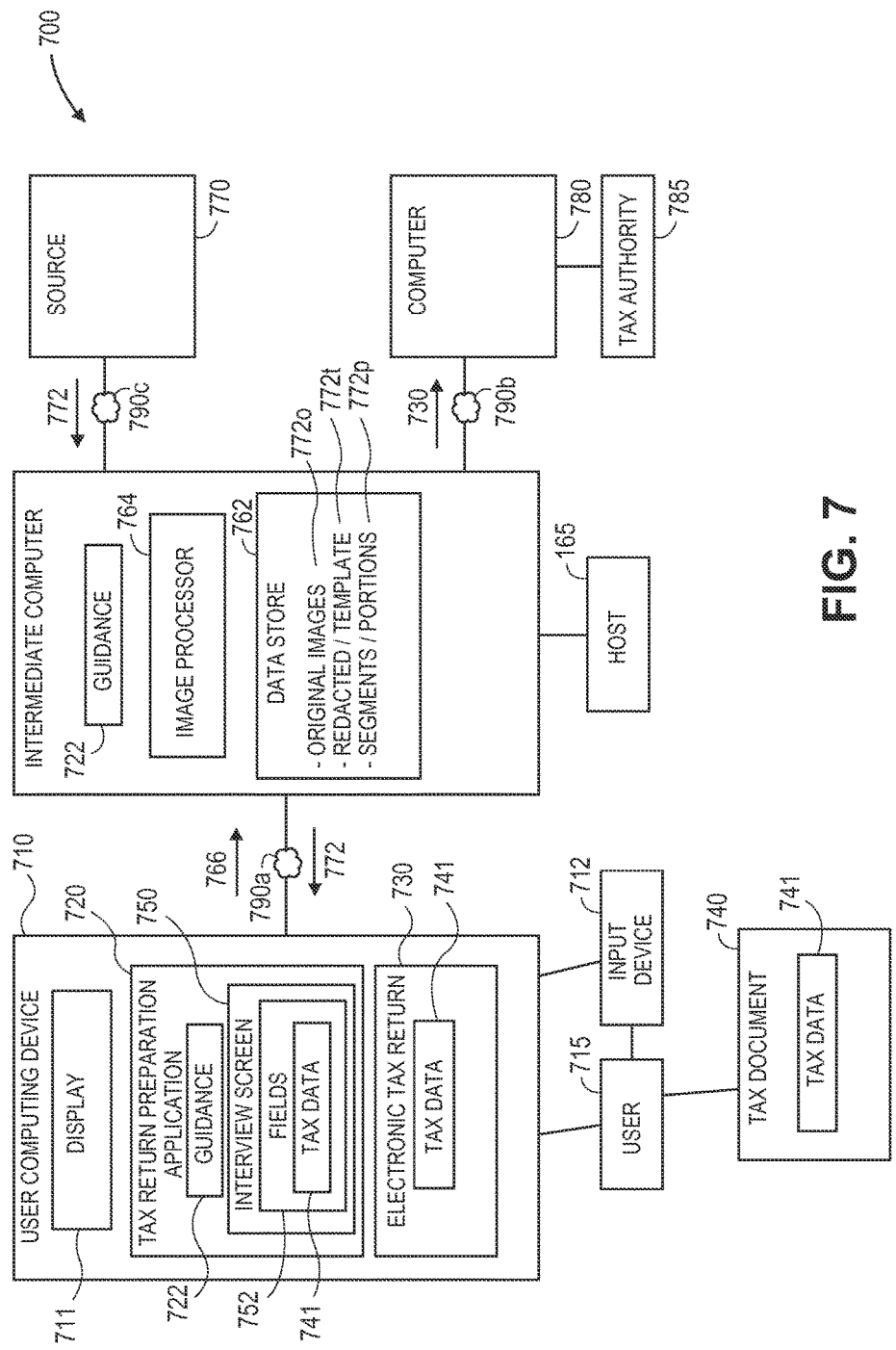
FIG. 7 is a block diagram of a system constructed according to one embodiment and configured to provide tax document guidance to a user during preparation of an electronic tax return.

Referring to FIG. 7, in a computerized system 700 programmed, configured or constructed according to one embodiment and components thereof that are utilized or involved in providing tax document guidance to a user 715 of a tax preparation application 720 comprises or involves a computing device 710 of the user or taxpayer 715 executing the tax return preparation application 720. The tax preparation application 720 is operable to prepare an electronic tax return 730 based on tax data 741 from one or more tax documents 740.

The user 715 may be the actual taxpayer or other user such as a tax professional, accountant or attorney preparing the electronic tax return 730 on behalf of the taxpayer. For ease of explanation, reference is made generally to a user 715 of the tax preparation application 720.

The user's computing device 710 may be a desktop, laptop or other computer or computing apparatus, or a mobile communication device such as a tablet computing device, smartphone or other mobile communication device executing a program or mobile application for the tax return preparation application 720 or executing a browser to access an on-line version of the tax return preparation application 720. Examples of tax return preparation applications 720 that may incorporate or utilize embodiments include a desktop version of TURBOTAX tax return preparation application and an online version available at turbotax.com, both of which are available from Intuit Inc.

Tax return preparation applications 720 such as TURBOTAX tax return preparation application generate a series of interview screens 750 displayed on a screen 711 of the user's computing device 710 and that present questions and fields 752 for the user 715 to enter tax data 741 into a field 752 or import or transfer tax data 741 from an electronic source such as a prior year electronic tax return or an electronic file of a financial management system (FMS) such MINT, QUICKEN and QUICKBOOKS financial managements systems. MINT, QUICKEN and QUICKBOOKS are also registered trademarks of Intuit Inc. The user 715 may manipulate one or more input devices 712 in order to navigate interview screens 750 and enter or import tax data 741 into respective fields 752. Examples of input devices 712 that may be utilized for this purpose include a computer mouse that generates a pointer (as shown in FIG. 1), a keyboard (e.g., a "tab" key or by use of a pre-determined key), and voice input and recognition.

The host 765 of the intermediate computer 760 may be the provider of the tax preparation application 720 such as Intuit Inc. While FIG. 7 illustrates an embodiment in which the tax preparation application 720 is a desktop version executing on the user's computing device 710 that is in communication with the intermediate computer 760, embodiments are not so limited such that in other embodiments, the intermediate computer 760 hosts an on-line version of the tax preparation application 720 (such as turbotax.com) that can be accessed by a browser executing on the user's computing device 710. For ease of explanation and illustration, reference is made to the system configuration shown in FIG. 7 in which the tax preparation application 720 executes on the user's computing device 710, and as described in further detail below, the intermediate computer 760 may be in communication with the user's computing device 710 to transmit images of portions of a tax document template, or download such images to the user's computer 710 for processing by the tax preparation application 720.

FIG. 7 also illustrates the intermediate computer 760 in communication with one or more sources 770 of images 772 of tax documents 740. While the source 770 and the user's computer 710 are shown as separate components, in one embodiment, the source 770 may be the user's computing device 710, e.g., when the user 715 provides an image of his or her own tax document 740. The source 770 may, in other embodiments, be a computing device of another user of the tax preparation application 720 or another source such as a computer of an employer, financial institution or other source of a tax document. For example, an employer may provide tax documents such as Form W-2 and a bank may provide tax documents such as 1099-INT.

The intermediate computer 760 may also be in communication with a computer 780 of a tax authority 785 and may serve as an electronic filing server for purposes of electronically filing tax returns 422 with the tax authority computer 780. The tax authority 785 with which tax returns 730 are filed may be a federal tax authority such as the Internal Revenue Service (IRS), a state tax authority such as the State Franchise Board of California or other federal, state or local tax collecting entity to which taxes are paid. Examples of tax documents 420 for a tax authority 785 such as the IRS include: W-2, 1099-A, 1099-B, 1099-C, 1099-DIV, 1099-G, 1099-H, 1099-INT, 1099-OID, 1099-LTC, 1099-PATR, 1099-Q, and 1098. It should be understood that these tax documents 740 are provided as illustrative examples, different tax collecting entities utilize different tax documents 740, and embodiments may be utilized to process and provide guidance for various tax documents 740 from various tax authorities 785. For ease of explanation, reference is made generally to a tax authority 785 and a tax document 440, a particular example is a tax document 740 in the form of a wage and tax statement such as Form W-2, but embodiments are not so limited.

Computing devices or computers 710 and 780, and computer or source 770 when applicable, are in communication with the intermediate computer 760 through respective networks 790a-c (generally, network 790). Each of the networks 790 and other networks discussed herein may be different, or two or more networks 790 may be the same depending on the system configuration and communication protocols employed. One or more or all of the networks 790 may be, for example, a cellular network, a wireless network, a Local Area Network (LAN) and/or a Wide Area Network (WAN) or a combination of two or more networks. Reference to a network 790 generally is not intended to refer to a specific network or communications protocol, and it should be understood that embodiments can be implemented using various networks and combinations thereof.

According to embodiments as generally illustrated in FIG. 7, the tax return preparation application 720 includes guidance module engine or element 722 (generally, "guidance" in FIG. 7), which is programmed, configured or operable to present an image to the user 715 through the tax preparation application 720. As shown in FIG. 7, the guidance module 722 is a component or module of the tax preparation application 720, but it may also be hosted or separately executed by the intermediate computer 760. While the intermediate computer 760 may also host and execute the guidance module 722 including or in communication with an image processor 764 and a database 762 as described in further detail below, for ease of explanation, reference is made to a tax preparation application 720 including or executing a guidance module 722, and the intermediate computer 760 including or executing an image processor 764.

The intermediate computer 760 hosts a data store or database 762 of tax document images 772 and an image processor 764 programmed or operable to process images 772 and store processing results to the database 762 for eventual processing by the guidance module 721 and presentation to the user 715. As described in further detail below, images 772 stored in the database 762 may include one or more of original tax document images or images 772o as received from a source 770 ("o" referring to "original" image), a redacted or sanitized tax document image or template 772t ("t" referring to redacted image or template), a selected segment or portion 772po of an original image ("p" referring to "portion" of original "0") and a selected segment or portion 772pr of a redacted image or template ("pr" referring to "portion" of "redacted" image). Reference is made generally to portions 772p.

The image processor 764 is programmed or operable to process tax document images 772 according to embodiments. In the illustrated embodiment, the image processor 764 manages the database 762 of images. The images 762 may be, for example, jpeg images or images of other formats such as a .pdf of a tax document). The image processor 764 detects features or elements of an image 772, e.g., by a recognition process such as Optical Character Recognition (OCR), processes images 772 by redacting tax data 771 from the tax document image 772 to transform the image 772 as received from a user or source 770 into a template or redacted tax document image 772t, and to determine or select a pre-determined portion 772p, which is provided to the guidance module 722 and presented to the user together with a highlighted field 131h therein as appropriate. According to embodiments, the database images 772 are referenced or indexed such that they are searchable by a keyword or identifier lookup or based on mapping of fields of an interview screen 750 and a particular portion of a tax document image 772. For example, as described in further detail below, the database 762 may store images 772 of Form W-2 from various users and/or employers or other sources 770, and these images 772 may be utilized or processed according to embodiments to provide guidance to users 715 to which a particular form applies. Further details regarding how system components described with reference to FIG. 7 are utilized are described in further detail with reference to FIGS. 8-21.

Figure 8:
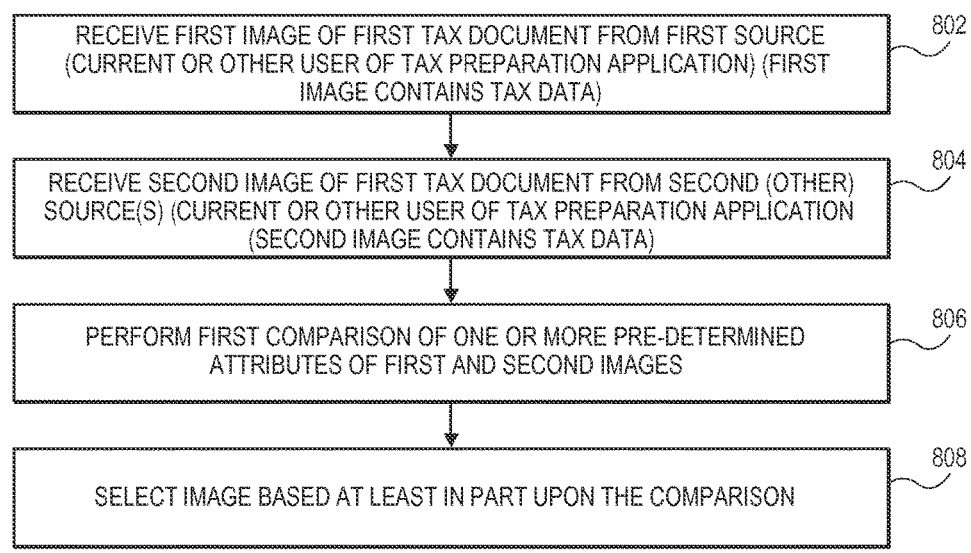
FIG. 8 is a flow diagram illustrating a method of processing tax document images involving comparing images to determine which image will be used for subsequent processing according to one embodiment.
Figure 9:
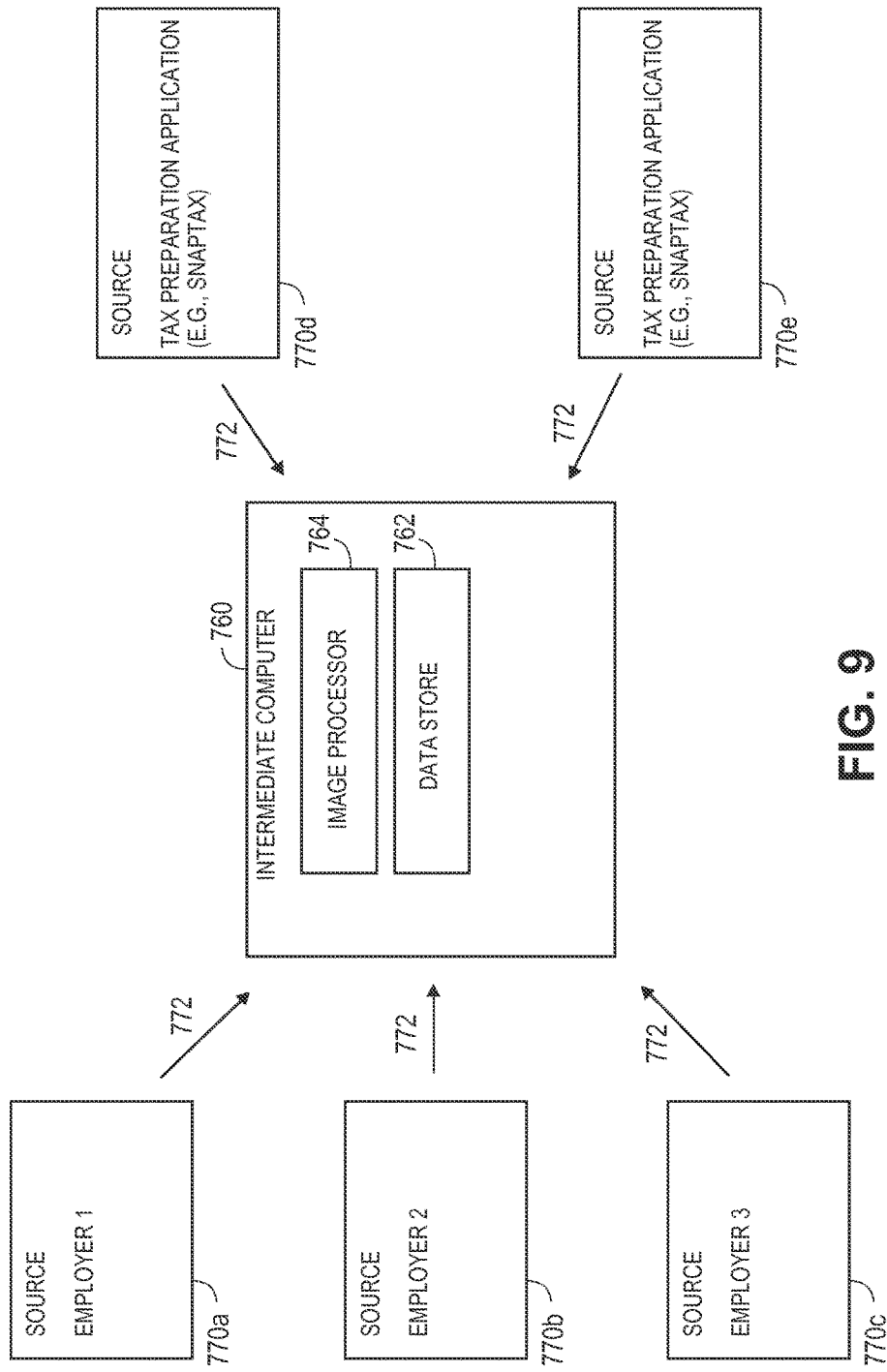
FIG. 9 further illustrates how tax document images are received from various sources according to one embodiment.

Referring to FIGS. 8-9, tax document images 772 are initially received from one or more sources 770. FIG. 8 illustrates multiple sources 770a-e that provide respective tax document images 772, but for ease of explanation, reference is made to a source 770 of a tax document image 772.

At 802, the image processor 764 may receive a first original image 722o of a first tax document from a first source 770. The first source 770 may be a first or current user 715, another or prior user of the tax preparation application 720 or an originator of the tax document image 772, such as an employer (as shown in FIG. 9) in the case of Form W-2. The first tax document image 772 may include first tax data 771 such as wage and tax data in the case of Form W-2. If the image 772 is received from an employer, for example, the image 772 may include tax data 771 or the employer may have deleted some or all of the tax data 771 such that what is received is an image 772 of a template or partially redacted Form W-2 utilized by that employer. The source 770 may also be the current or other user. For this purpose, for example, a user 715 of the tax preparation application 720 may acquire an image 772 of their own tax document 740 using an imaging or camera element such as a webcam of the computing device 710, or take a picture of the tax document 740 with a camera and transfer the image 772 to the computing devices 710 and/or 760. Image acquisition may also involve a tax preparation application such as SNAPTAX tax preparation application available from Intuit Inc.

At 804, in one embodiment, the image processor 764 receives at least one other image 772 of the same type of tax document 740 from a different source 770, which may be another user of the tax preparation application 720 or an originator of the tax document 740. Thus, for example, a first employee of Google Inc. may take a picture of his Form W-2 and transmit the resulting image 772a to the intermediate computer 760, and a second employee of Google Inc. may take a picture of her Form W-2 and transmit the resulting image 772b to the intermediate computer 760, and the employer, Google Inc., may transmit an image to the intermediate computer 760, e.g., in response to a request by the host 765. While embodiments are described with reference to two or three images 772 received, it will be understood that embodiments may involve receiving different numbers of images 772 of a tax document 740, e.g., 10, 100 or thousands of images from various users, as generally illustrated in FIG. 9.

Figure 10:
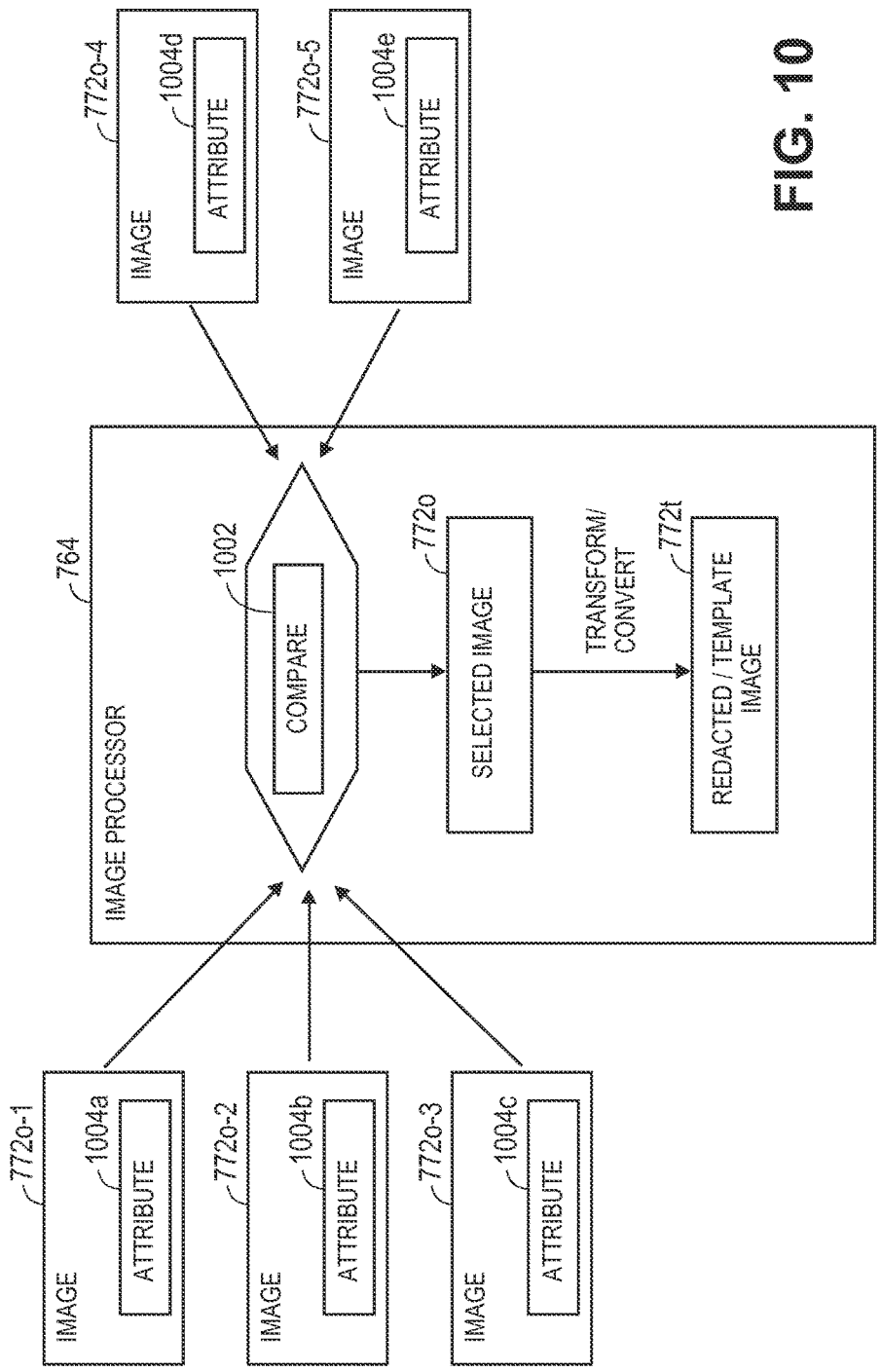
FIG. 10 further illustrates how tax document images are received from various sources and attributes thereof are compared by an image processor in order to select a tax document image for subsequent processing according to embodiments.

With continuing reference to FIG. 8, and with further reference to FIG. 10, the received tax document images 722 are processed. FIG. 10 illustrates an example in which multiple images 772a-c of the same type of tax document 740 are received by the image processor 764, e.g., multiple Forms W-2 from different employees of the same employer. At 806, the image processor 764 performs an initial analysis or comparison 1002 of received images 722 to determine which of the images 722a-c should be selected as being the best image or the image that satisfies pre-determined criteria for subsequent processing. For this purpose, the image processor 764 may determine data of one or more pre-determined attributes 1004a-c (generally, attribute 1004) of the images 722 and compare 1002 data or values of the pre-determined attributes to determine which image 722 to select. For example, pre-determined criteria may involve one or more or all of image quality, camera settings used to acquire an image 722, image 722 orientation or format.

For example, image attributes 1004 and pre-determined criteria may involve image quality and the image processor 764 accessing data file of the image 722 to access, for example, one or more types of attribute 1004 data including data of brightness, contrast, noise, histogram data and Exchangeable image file format (EXIF) data such date and camera settings such as (e.g., International Standard Organization (ISO) sensitivity settings, which affect the amount of noise that appears in an image 722. Other pre-determined attributes 1004 and combinations thereof may be utilized in the comparison 1002 such that the above examples are provided for purposes of explanation and illustration, not limitation.

At 806, the image processor 764 performs a first comparison 1002a of data of one or more pre-determined attributes 1004 of received images 722, and at 808, selects a tax document image 722 from the plurality of tax document images 722 based at least in part upon the comparison 1002a. The image 722 that is selected may be, for example, the image 722 that satisfies the most pre-determined criteria, satisfies a minimum number of pre-determined criteria, or satisfies a weighting function given multiple criteria or attributes. For example, an image 722 may be selected if the brightness is within a pre-determined range and the image 722 has the lowest noise level or was taken with the lowest ISO setting.

Figure 11:
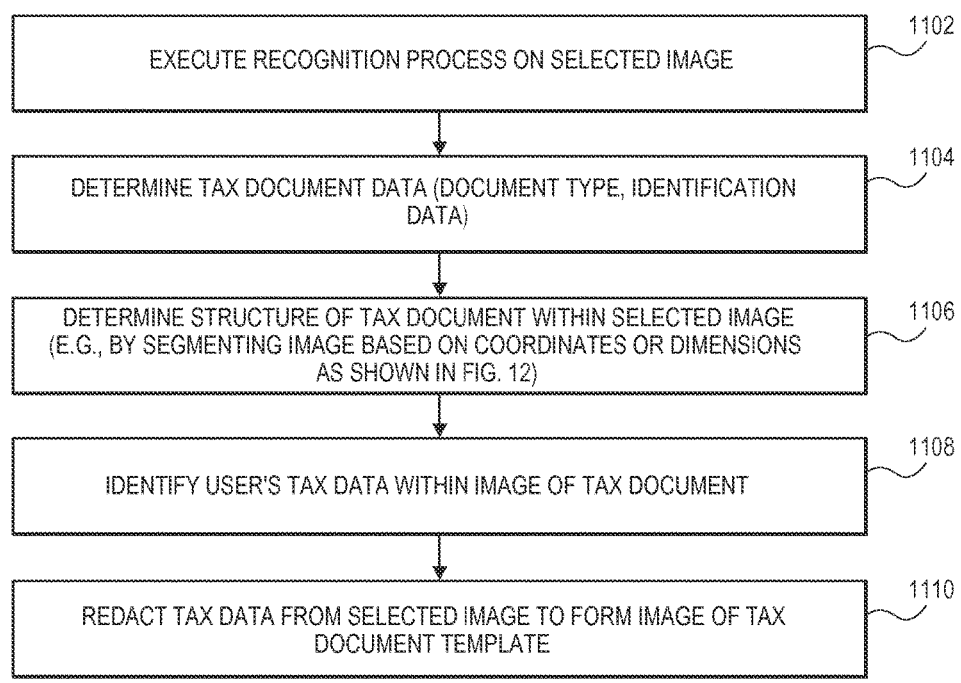
FIG. 11 is a flow diagram illustrating a method of processing tax document images including redacting tax data from a tax document image to generate a tax document template or redacted tax document image according to one embodiment.

Referring to FIG. 11, the image 722 that is selected is converted or transformed into an image of a tax document template or redacted version 722t of the received original image 722o (e.g., in embodiments in which an original image 722o rather than a template is received from the source 770). In the illustrated embodiment, image transformation or conversion involves, at 1102, the image processor 764 executing a recognition process (such as Optical Character Recognition) (OCR) on the selected original image 722o, and at 1104, determining tax data 741/771 within the image 722. The determined data 771 may include the name or type of the tax document 740 that was imaged (e.g., Form W-2), a source 770 of the tax document 730 (e.g., an employer in the example involving Form W-2), user tax data 741/771 and a field or box structure of the imaged tax document 740.

Figure 12:
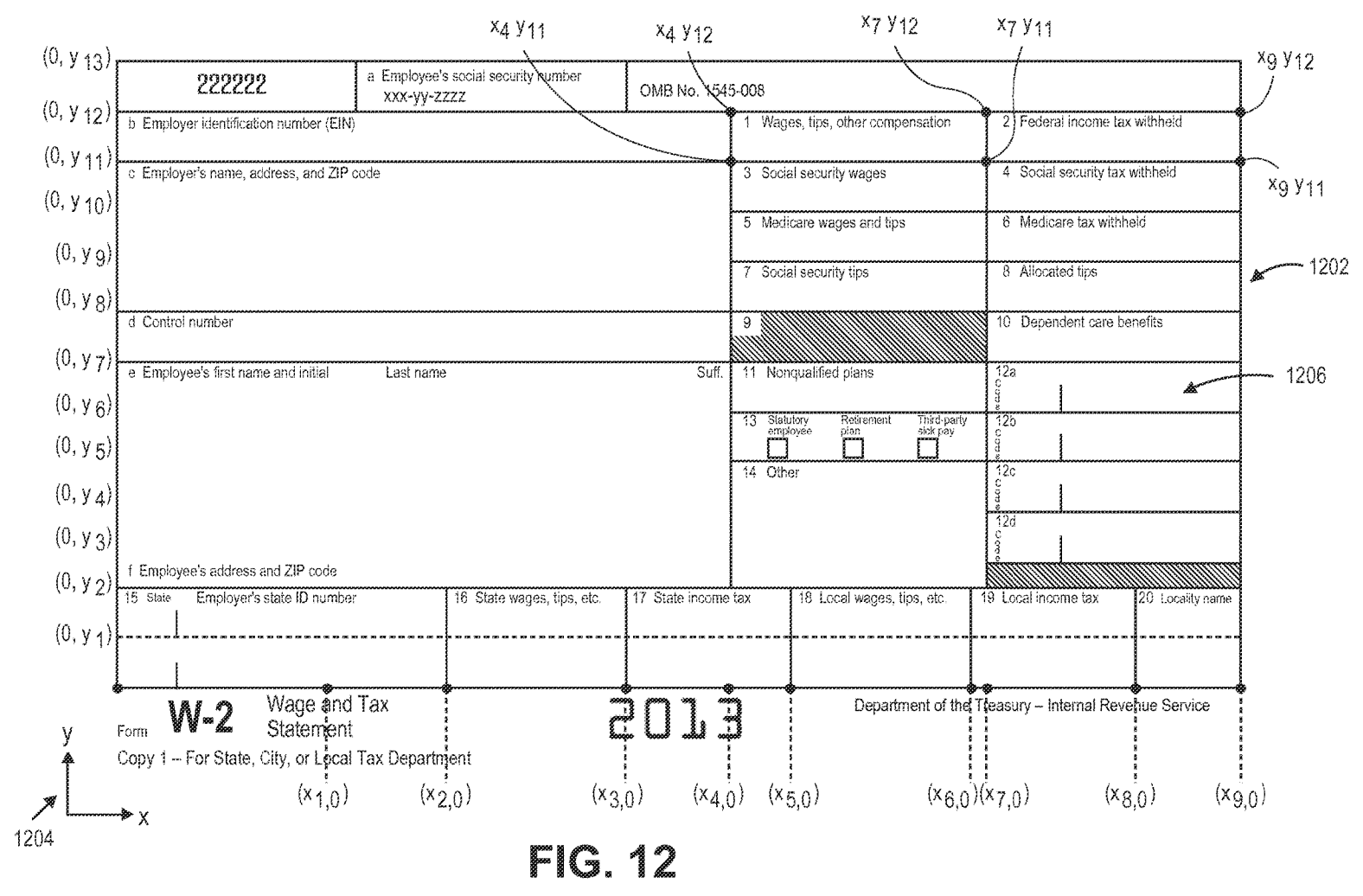

For example, referring to FIG. 12, a recognition process executed by the image processor 764 may involve both detection of features or structures 1202 within the redacted image or template 772r, a coordinate or reference system 1204 for determining feature 1202 locations, and detection of alpha-numeric data 1206 (not illustrated in FIG. 12) within features 1202, e.g., within a feature 1202 of a detected field or box. Thus, the result generated by the image processor 264 includes not only recognized alpha-numeric tax data 1206, but also coordinates or locations of imaged tax document fields or features 1202 including alpha-numeric tax data 1206.

For example, as shown in FIG. 12, segment or portion of an image 722t defined by recognized feature segments defined or joined by coordinates x4, y11; x4, y12; x7, y11 and x7, y12 may define an image segment containing tax data for "Wages, tips, other compensation, and a recognized features segments defined or joined by coordinates x7, y11; x7, y12; x9, y11 and x9, y12 may define an image segment containing tax data for "Federal income tax withheld." Referring again to FIG. 11, at 1108, the image processor 264 identifies imaged tax data 741, and at 1110, deletes or redacts the identified tax data 771 from the image 772 (as shown in FIG. 12) to generate an image of a redacted image or tax document template 722t.

Figure 13:
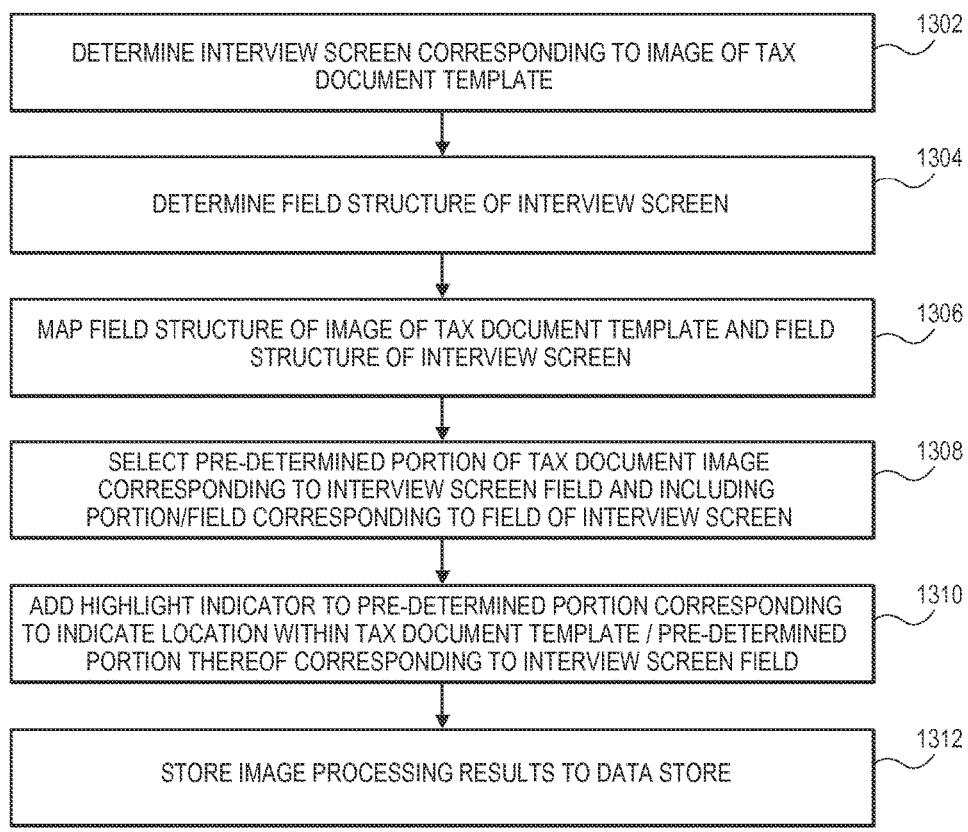
FIG. 13 is a flow diagram illustrating a method of processing according to embodiments involving mapping sections or fields of an interview screen to selected sections or segments of a tax document image or template.

Referring to FIG. 13, at 1302, the image processor 764 determines or receives data indicating which interview screen(s) 110 of the tax preparation application 720 correspond to a tax document image or redacted tax document template 722t, i.e., which interview screen 710 asks questions or includes fields 112 to be populated with tax data 111 from the user's actual tax document 740 that is formatted or structured in the same or substantially the same way as the received tax document image 722o or redacted tax document template 722t. For example, the host 765 may designate these links or the image processor 764 can determine the name of the tax document (e.g. Form W-2) and access database 762 that cross-references a corresponding interview screen 710.

Figure 14:
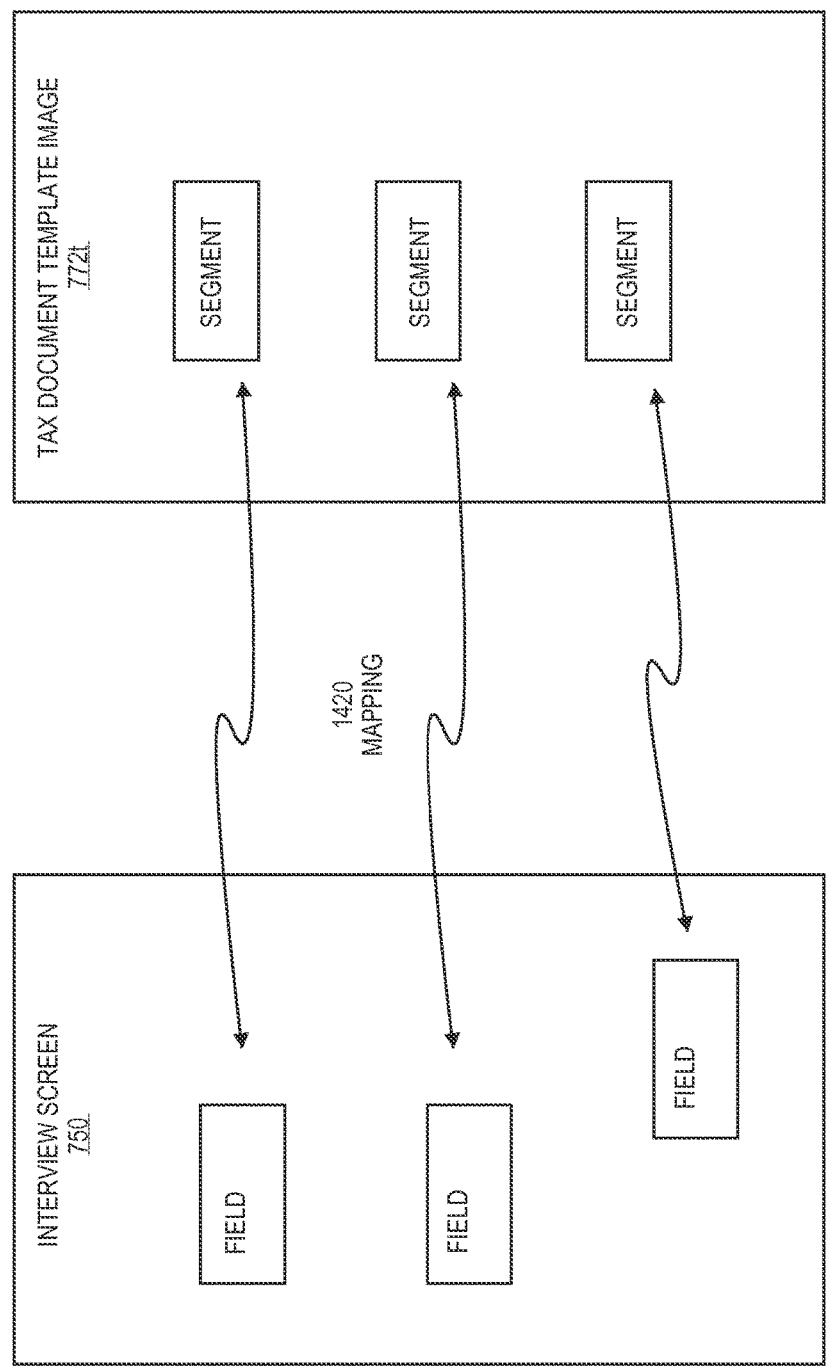
FIG. 14 is a block diagram further illustrating mapping between interview screen fields and tax document template image segments according to embodiments.
Figure 15:
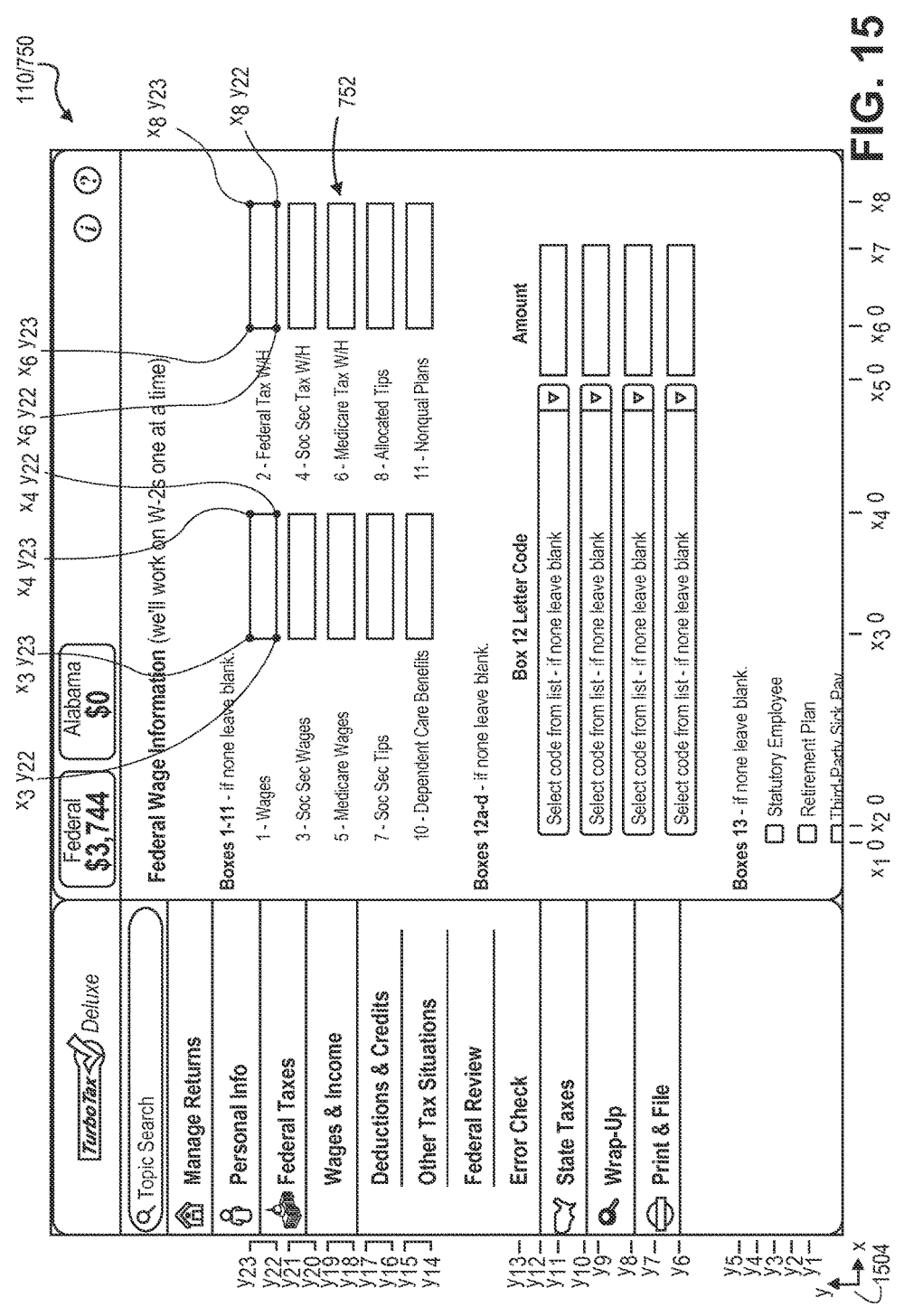
Figure 16:
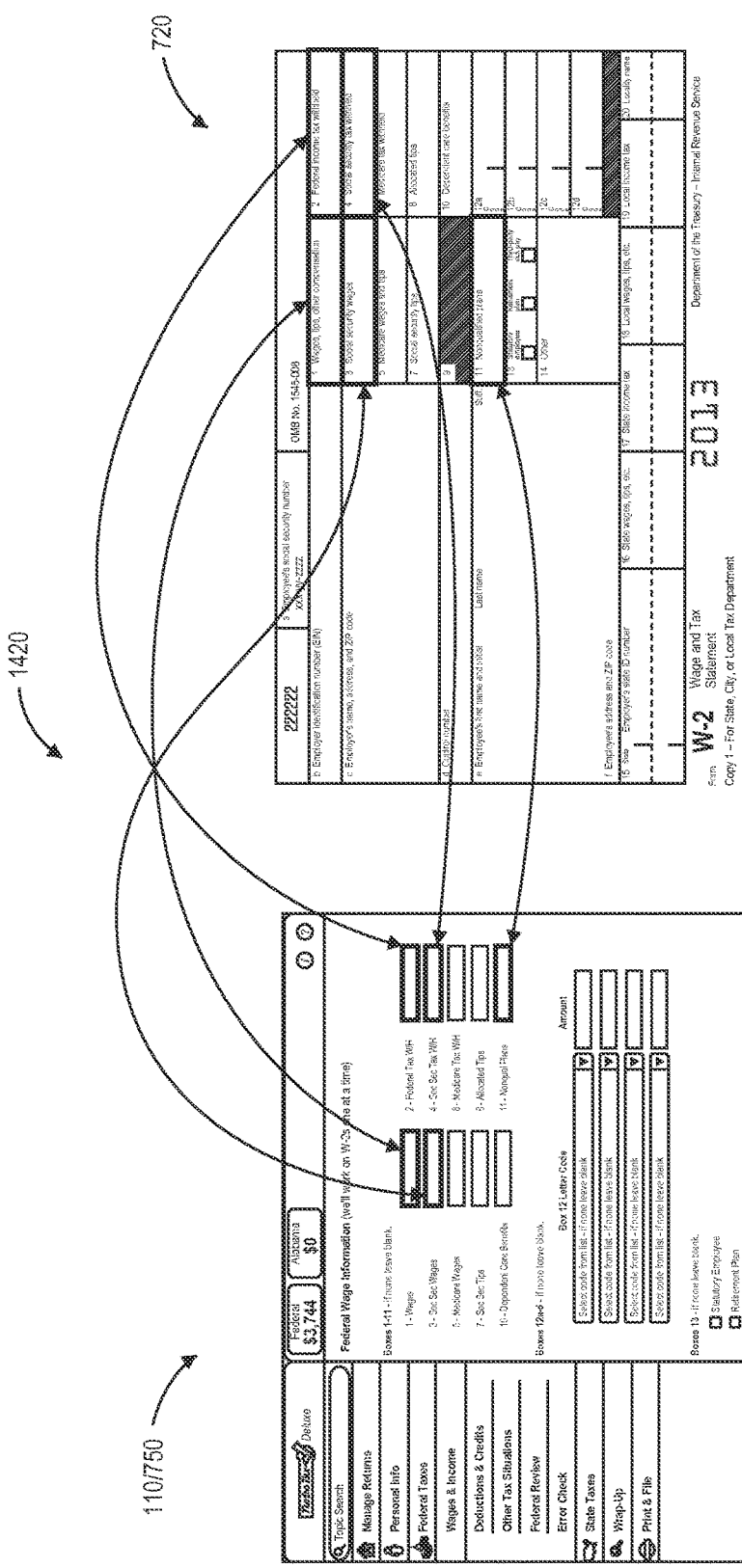
FIG. 16 illustrates an example of mapping fields of Form W-2 and segments of an image of a template of Form W2.

At 1304, and with further reference to FIGS. 14-16, the image processor 264 determines the field structure of an interview screen 110/750 or the location of fields 112 within the interview screen 110, or within a screen or display 711 of the computing device 710. At 1306, the image processor 264 maps 1420 the field structure of the interview screen 750 (as shown in FIG. 15) to the field structure of the tax document image or redacted image or template 722t (as shown in FIG. 13). According to one embodiment, as illustrated in FIG. 14, the image processor 264 receives or determines a field structure of the interview screen 750, e.g., as received from the host 265 or by accessing files of the tax preparation application 720. Thus, there is a link or associations between a particular field in an interview screen 750 and a particular segment or pre-determined portion of the redacted tax document image or template 722t. While FIGS. 13-16 describe one embodiment in which mapping 1420 is based on locations within a tax document template 722t and locations within an interview screen 750 generated by the tax preparation application 720, it will be understood that embodiments are not so limited and that other linking or mapping 1420 methods may be utilized, e.g., by use of tags or keywords associated with respective interview screen fields 112 and segments 752 of a tax document template 722t.

Further details of examples of how image processing and mapping may be performed are described in the following applications, all of which are commonly owned by Intuit Inc., and all of which are incorporated herein by reference as though set forth in full for all purposes: U.S. application Ser. No. 13/781,393 filed May 28, 2013, and entitled "Systems and Methods for Tax Data Capture and Use; PCT/US13/40628 filed on May 10, 2013; U.S. application Ser. No. 13/781,540 filed May 28, 2013 and entitled "Presentation of Image of Source of Tax Data Through Tax Preparation Application"; PCT/US13/40647 filed on May 10, 2013; U.S. application Ser. No. 13/781,571 filed Feb. 28, 2013 and entitled "Tax Document Imaging and Processing"; and PCT/US13/40620 filed on May 10, 2013 .

Figure 17A:
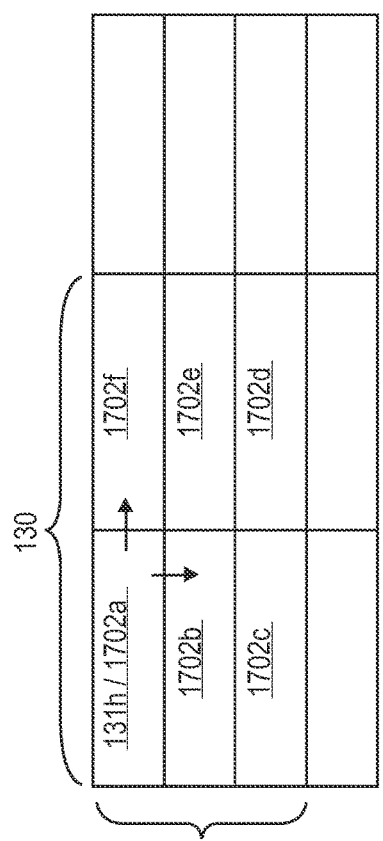
FIGS. 17A-B illustrate examples of how embodiments may select a segment of a tax document image or template image and indicate or highlight a particular segment thereof according to embodiments.
Figure 17B:
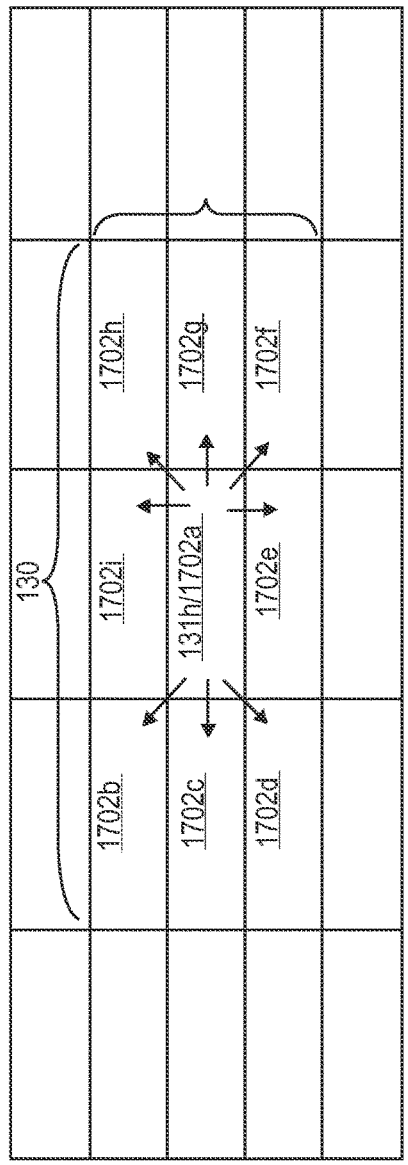

Continuing with reference to FIG. 13 and with further reference to FIGS. 17A-B, at 1308, the image processor 264 selects or determines a pre-determined portion 131h of the tax document template image 722t including the determined segment 130 that was mapped to a field 752 of an interview screen 750. For example, referring 17A, a segment 130 of the tax document template 722t is mapped to a field 752 of an interview screen 750 as described above and includes an identified or highlighted segment 131h in the upper left corner thereof. The image processor 264 identifies other segments 1702a-e adjacent to or surrounding the subject segment 131h (generally, 1702). The other adjacent or surrounding segments 1702 include imaged tax document fields adjacent to the subject imaged field 131h. In the illustrated embodiment, the other or adjacent fields 1702 are identified based on extension in multiple directions (represented by arrows) from the subject segment 131h, e.g., to the segment 1702a below, to the segment 1702c to the right, and to the segment 1702d diagonal relative to the subject segment 131h. In the illustrated embodiment, there are no segments to the left or above the subject segment 131h. The image processor 264 may identify other or adjacent segments 172 that are adjacent to or that surround the subject segment 131, and may also identify one or more other segments (such as segments 1702b and 1702e) hat are adjacent to or surround those adjacent or surrounding segments (such as segments 1702a and 1702d). As shown in FIG. 17A, the portion of the tax document image template 722t that is selected includes six segments, including the subject segment 131h and five other adjacent or surrounding segments 1702a-e. Thus, certain segments 1702a, c-d may contact or touch the subject segment 131h, whereas others 1702f-m in the pre-determined portion 130 may be outer level or surrounding segments.

Referring to FIG. 17B, another example is illustrated in which a subject segment 131h that is mapped to a field 752 of an interview screen 750 is surrounded in all directions (represented by arrows) by other segments 1702f-m (generally, 1702). Thus, the surrounding segments 1702 include one or more segments above, below, to the right, to the left, and at each corner or diagonal relative to the subject segment 131h. The image processor 264 may also identify other or adjacent segments that are adjacent to or that surround an adjacent or surrounding segment 1702. Thus, in the illustrated embodiment, the portion of the tax document image template 722*t* that is selected for the subject segment 131*h* includes nine segments including the subject segment 131*h* and eight other adjacent or surrounding segments 1704*f-m*.

For the purpose of identifying a pre-determined portion 130 including a subject segment 722*t* and other adjacent or surrounding segments 1702, the image processor 264 may, for example, be programmed or configured to automatically include any segment adjacent to or surrounding a subject segment 131*h* (e.g., within a first level or first degree of separation), to include only those that are in direct contact with the subject segment 131*h*, or to include at least one additional level of segments (i.e., segments beyond the adjacent or surrounding segments). In other embodiments, the image processor 264 may receive input from the host 265 regarding a pre-determined portion 130 to be utilized for a particular subject segment 131*h*.

Thus, in the embodiments illustrated in FIGS. 17A-B, multiple imaged fields within the pre-determined portion 130 may be mapped 1420 to a particular interview screen field 753 (such that the mapping 1420 involves a ratio of imaged fields within a pre-determined portion 130 to the interview screen field 752 is greater than 1:1), but embodiments are not so limited. For example, the pre-determined portion 130 may be a single segment including an image of a single tax document field such that the ratio of imaged fields to interview screen fields is 1:1. Further, while certain embodiments are directed to selecting or determining a portion of an image of a tax document template 722*t* to present to the user 715, embodiments may also involve presenting the entire tax document image 722 and highlighting or indicating a particular field within the image of the entire document. For ease of explanation, reference is made to the pre-determined portion including a plurality of segments 1702 or a plurality of imaged fields of the tax document template 722*t*.

Referring again to FIG. 13, at 1310, a highlight, border or other indicator (generally, highlight) is added to the pre-determined portion to signify the particular segment 131*h* thereof that includes an imaged field corresponding to an interview screen field 752. This may involve, for, example, the image processor 264 modifying the image of the pre-determined portion by adding a boundary around a subject segment, and the boundary may be a different color, line width, or have some other distinguishing feature relative to other pre-determined portion segments 1702, e.g., as shown in FIGS. 1 and 4A-C.

At 1312, the results generated by the image processor 264 are stored to a data store or database. For example, the image processor 264 may generate and update one or more tables in the database 762 for each source 270 of a tax document image 772 (e.g., for each employer in the case of Form W2) and specify an interview screen identifier 766 (such as a tag or keyword of the interview screen field 752, or coordinates of the interview screen 750), and identification of a field of a pre-determined portion 130 generated and processed according to embodiments. For example, for a particular source 270 or employer (e.g., for Form W-2 for Intuit Inc.), the database 762 or table may include a table or other data structure cross-referencing interview screen coordinates or a range of coordinates corresponding to or defining a field 752 of an interview screen 750 as displayed to the user and that can be selected by the user 715 by hovering over a flied 752 of the interview screen, an identifier of the interview screen 750 (e.g. interview screen for Form W-2), an identifier or name of an image or template of a tax document image (e.g., a Form W-2 template), identification or location of a pre-determined portion 131*h*, or a reference or coordinates of a pre-determined portion of the tax document template image 722*t* to be selected by the guidance module 722.

Thus, there may be a table or database entry for a first employer that provides Form W2 in a first format, another table or database entry for a second employer that provides Form W2 in a second format, and so on for various employers. The database 262 may store or reference the pre-determined portion 131*h*, or identify a portion of the tax document template 722*t* thereof to be retrieved or selected for presentation to the user 715.

Figure 18:
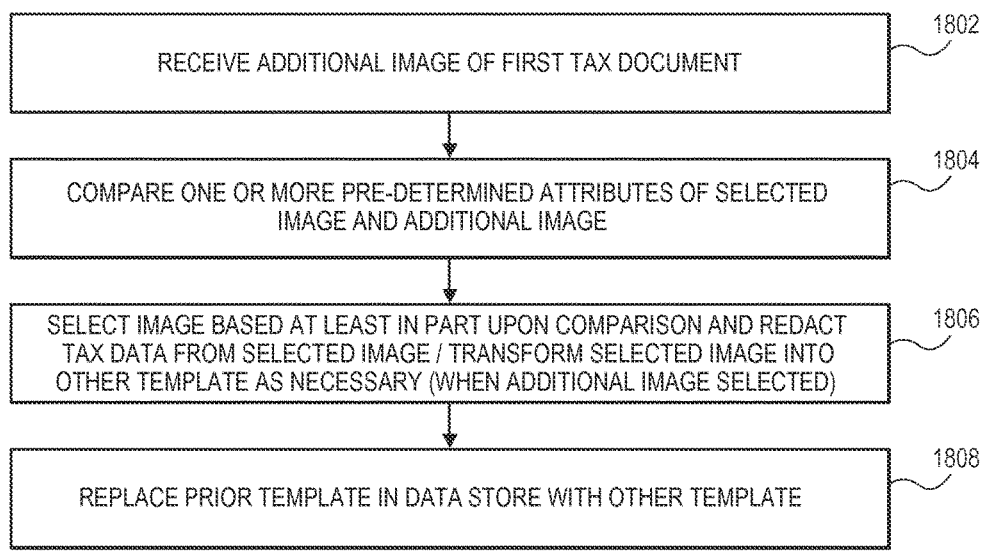
FIG. 18 is a flow diagram illustrating a method for determining whether to replace a tax document image or template image with another tax document image or template.
Figure 19:
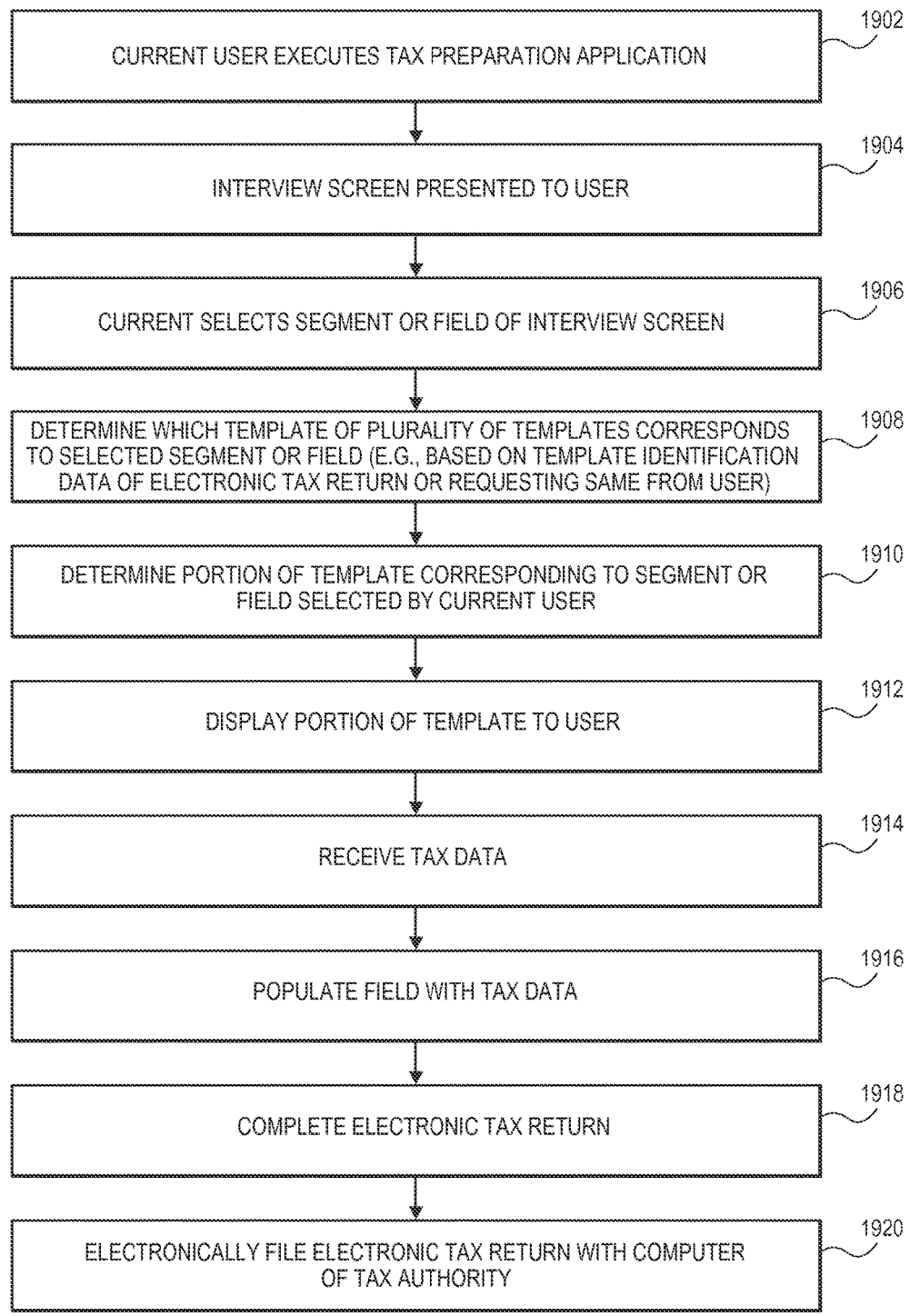
FIG. 19 is a flow diagram illustrating a method of providing tax document guidance to a user while the user navigates an interview screen for Form W-2 according to one embodiment.

Referring to FIG. 18, and as described above with reference to FIG. 10, in the event that an image of the tax document is received from another source, the image processor 264 receives other tax document images 722 of the same type, e.g., from employees of the same employer at 1802, then at 1804, the image processor 264 compares one or more pre-determined attributes 1004 of the stored image or template 722 and new images 722 received from the source and selects an image 722 or replaces a previously selected image with a new image based at least in part upon comparison Thus, referring to FIG. 19, during use, at 1902, a user 715 executes the tax preparation application 720, and at 1904, an interview screen 750 is presented to the user 715 on the display 711 of the computing device 710. At 1906, the user 715 selects segment or field 752 of interview screen 750, e.g., by manipulating a mouse (by click or hover) or other input device 712 such as a keyboard or by voice command. At 1908, the guidance module 722 determines which template 722 of a plurality of templates corresponds to the segment or field 752 selected by the user, e.g., by receiving, accessing or reading identification data 766 of electronic tax return 730 or requesting same from user. This data is utilized by the guidance module 760 at 1910 to access the database 762 and determine which portion of the template 722*t* corresponds to the selected field 752, and at 1912, the selected field (e.g., including a highlighted section 131*h* and other adjacent segments 1702) is retrieved from the database 762 or selected, e.g., cropped, from a template image 722*t*, and displayed to the user 715. At 1914, the user 715, having the benefit of knowing where in his or her own tax document 740 to look for tax data 741, determines the tax data 741 and enters the tax data 741 into the electronic tax return 730 such that the field 752 that was selected is populated at 1916. Eventually, at 1918, the electronic tax return is completed, and filed with a computer 780 of the tax authority 785 at 1920.

Thus, in one embodiment, as described above, the pre-determined portion is selected and processed and stored in the database 762 before the user's input is received, and then retrieved in response thereto, e.g., based on a lookup using identification data such as an employer identification 766. For this purpose, the guidance module 722 may utilize a matching algorithm to determine which template image 722 or segment should be selected, one example of which is the Levenshtein distance or edit distance in order to determine the identification data in the event that there is not an exact match (e.g., if a user inadvertently spells an employer name as "Gooogle" rather than Google" in order to determine or deduce what the user 715 intended.

In other embodiments, processing of a tax document template 722*t* occurs in response to receiving the employer identification 766, which may be sent or generated in response to the user's selection of a field 752 of an interview screen 750 or in response to a request by the guidance module 310 following a request by the user 715 in the form of selection of a field 752. Thus, the pre-determined segment may not be known or identified at the time the user selects an interview screen field 752.

Figure 20A:
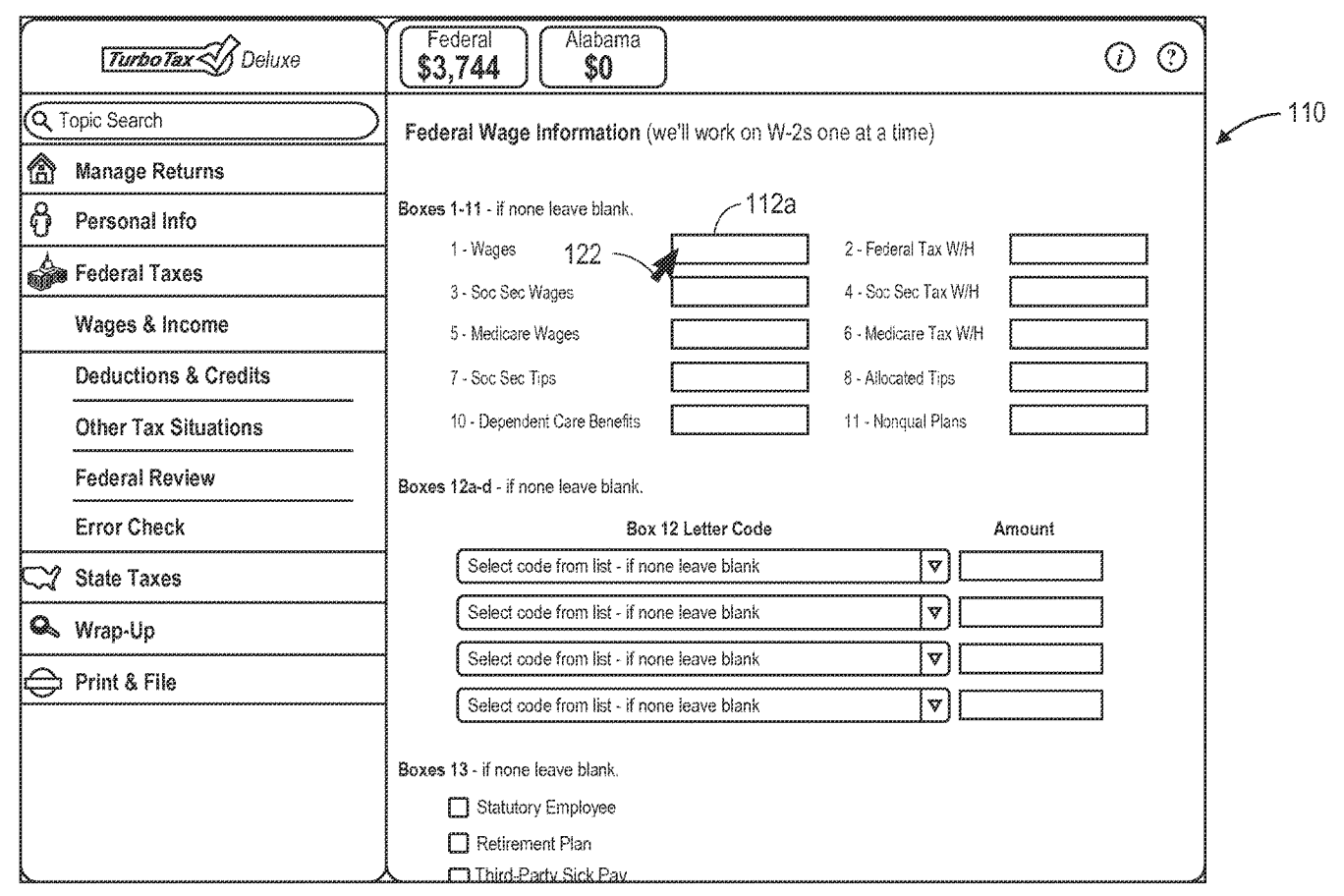
Figure 20B:
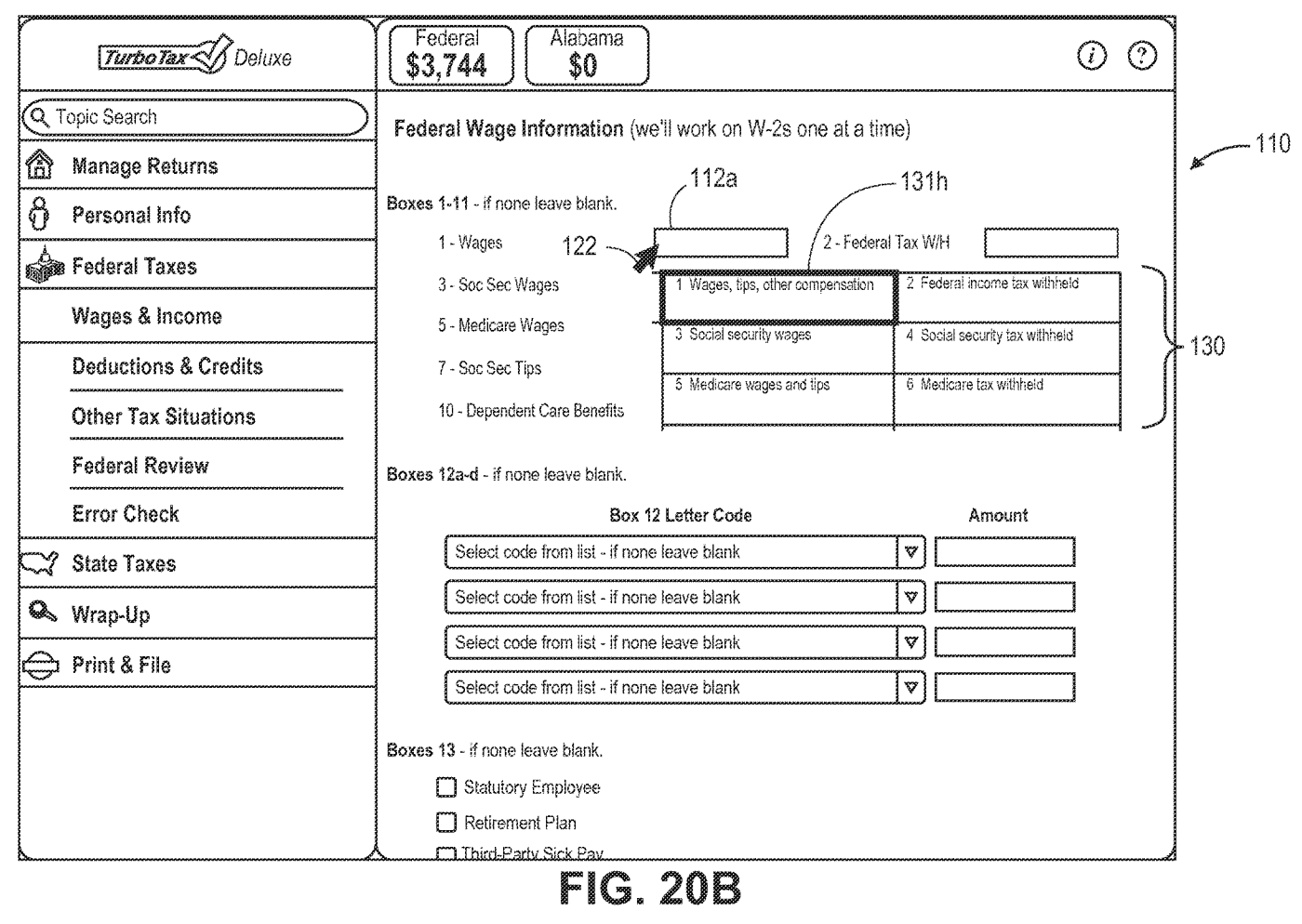
Figure 20C:
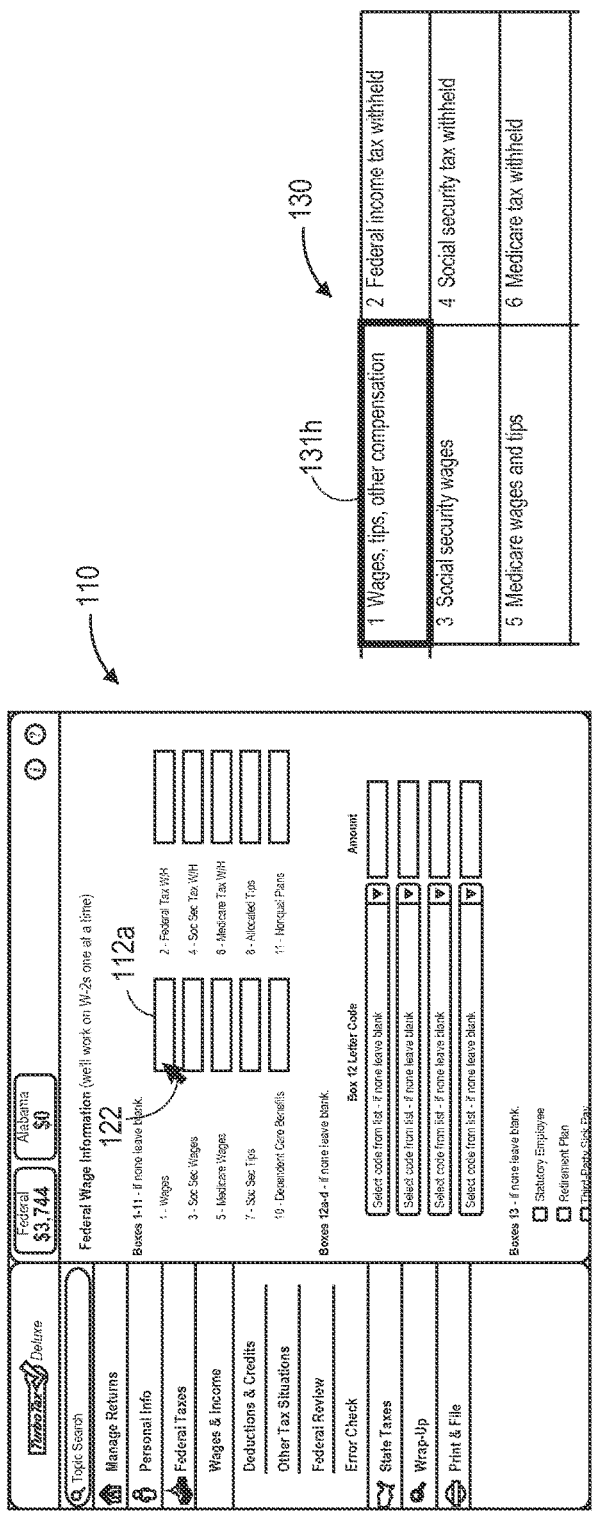

FIGS. 20A-H illustrate one example of how embodiments may be implemented. Referring to FIG. 20A, the user 715 has navigated to an interview screen 750 for Form W-2. The interview screen 750 includes a field 752*a* for "1-Wages," a field 752*b* for "2-Federal Tax W/H", etc. In the illustrated embodiment, the user 715 manipulates an input device 712 such as a mouse, such that the mouse pointer 122 hovers over field 752*a*. Referring to FIG. 20B, in response to detecting selection of field 752*a*, the guidance module 722 accesses the database 762 (e.g., by use of table 1800) to identify or determine the segment 730 associated with the field 752*a*, which is displayed to the user. In the illustrated embodiment, the segment includes a highlighted segment 131*h*. FIG. 20B illustrates how the segment or portion of the tax template 722*t* that is displayed overlays or covers at least a portion of the displayed interview screen 750, e.g., one or more other fields besides the selected field 752*a*. FIG. 20C illustrates another embodiment in which a split-screen or split view within a single screen configuration is utilized instead such that no field 752 of the interview screen 750 is covered by the displayed template portion or segment.

Figure 20D:
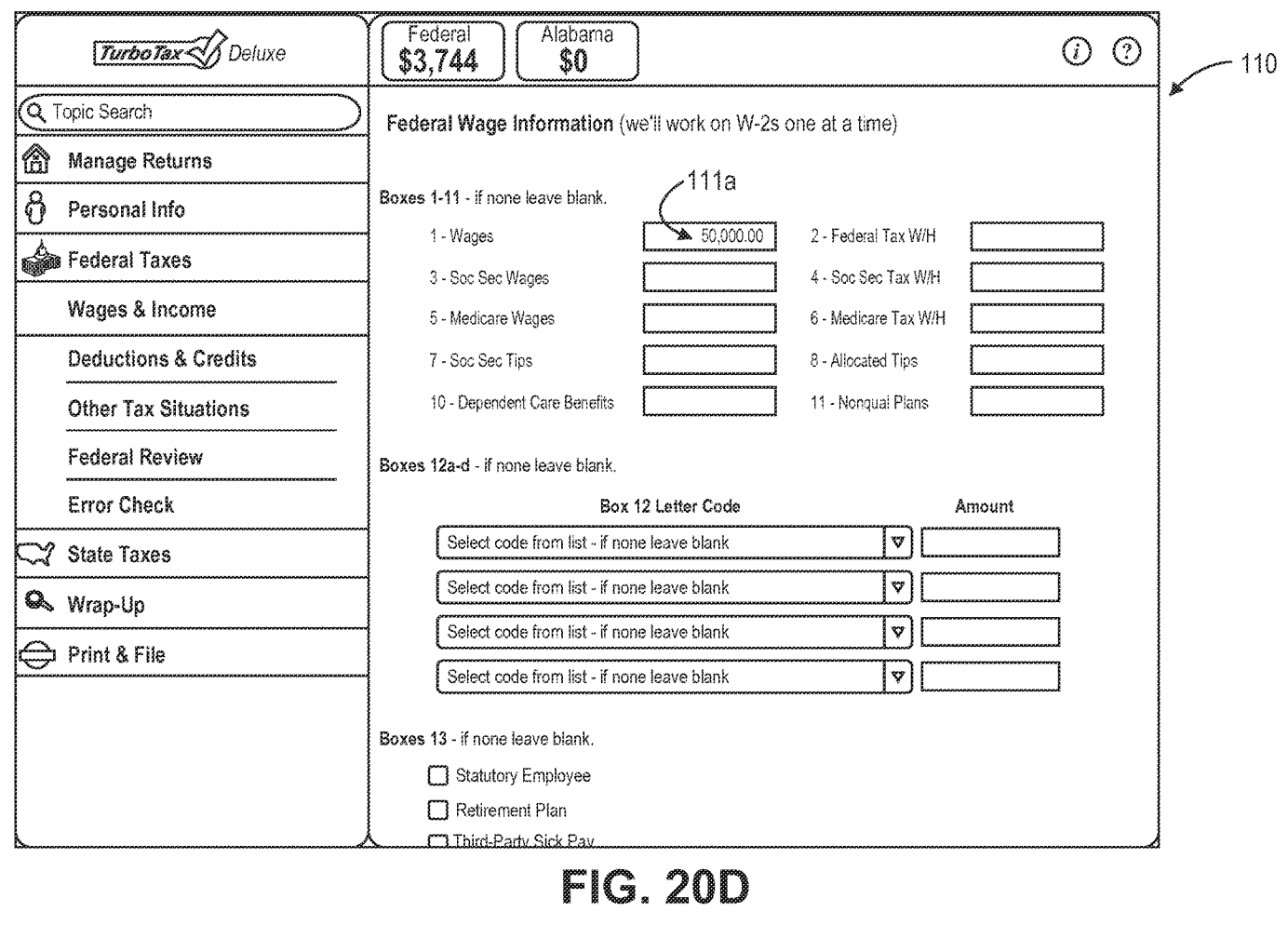
Figure 20E:
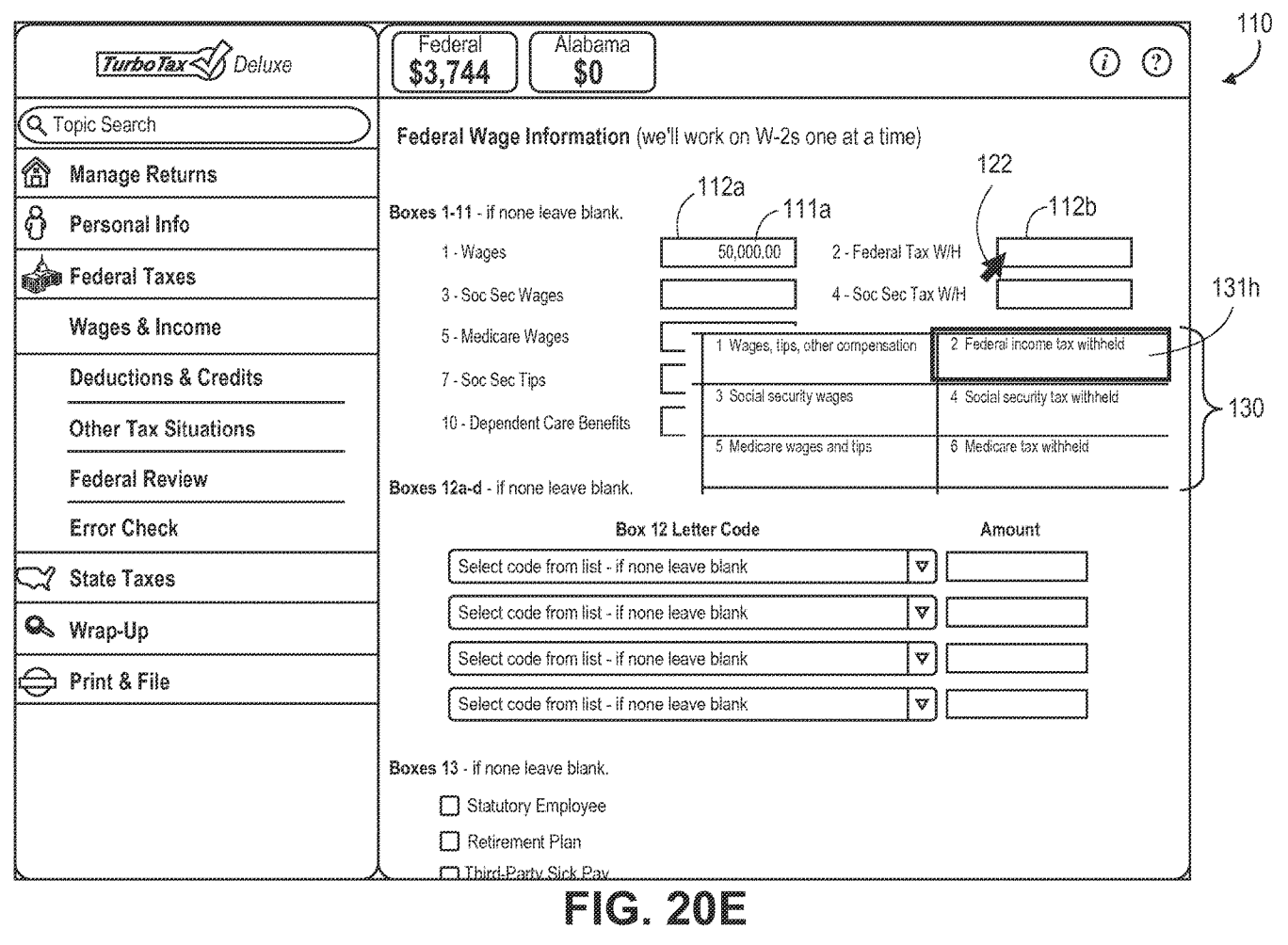
Figure 20F:
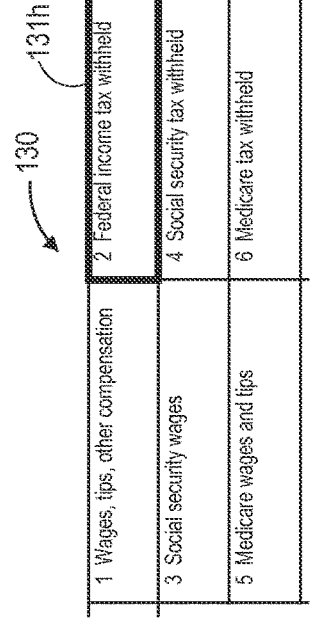
Figure 20G:
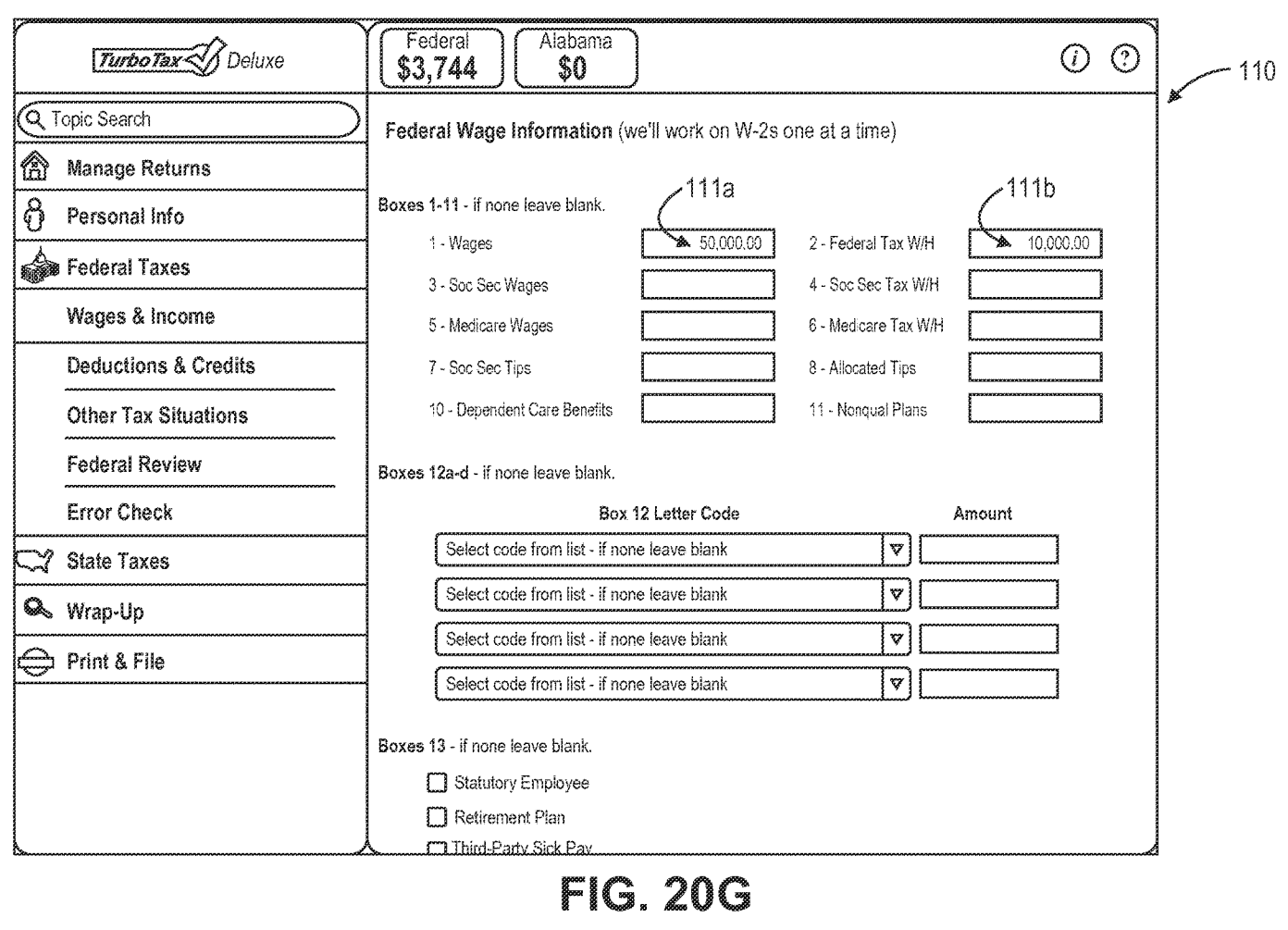
Figure 20H:
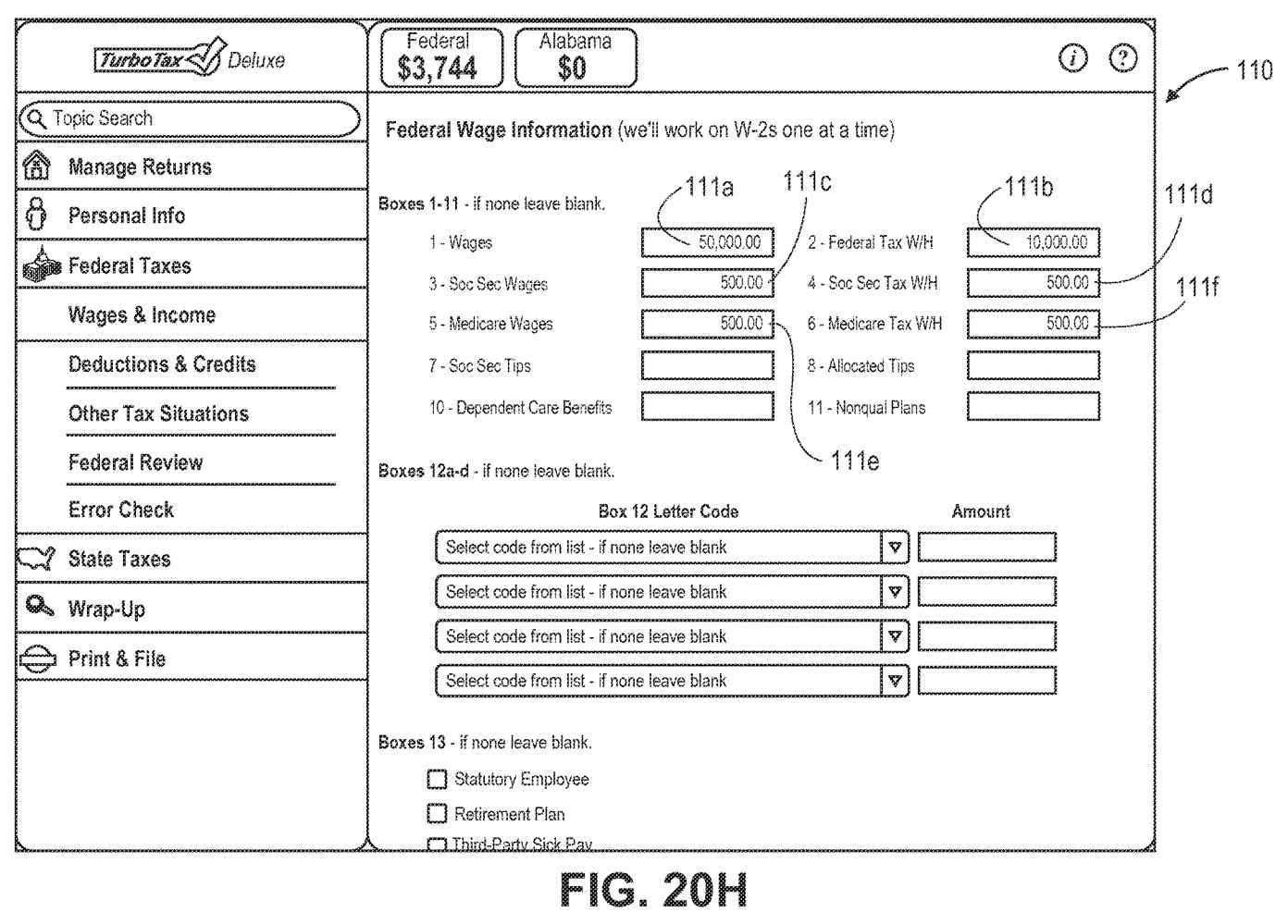

Referring to FIG. 20D, the user 715, being guided by the segment that is displayed, consults his or her own tax document 740, determines the tax data 741*a* corresponding to the highlighted field 131*h*, and populates field 752*a* with the tax data. Referring to FIG. 20E, the user 715 then manipulates the mouse such that the pointer 122 now hovers over a different field 752*b*, and the process is repeated for this and other fields 752 as shown in FIGS. 20F-G, and other fields 752 are populated with tax data 741 as shown in FIG. 20H, and the electronic tax return 730 is eventually completed.

Figure 21:
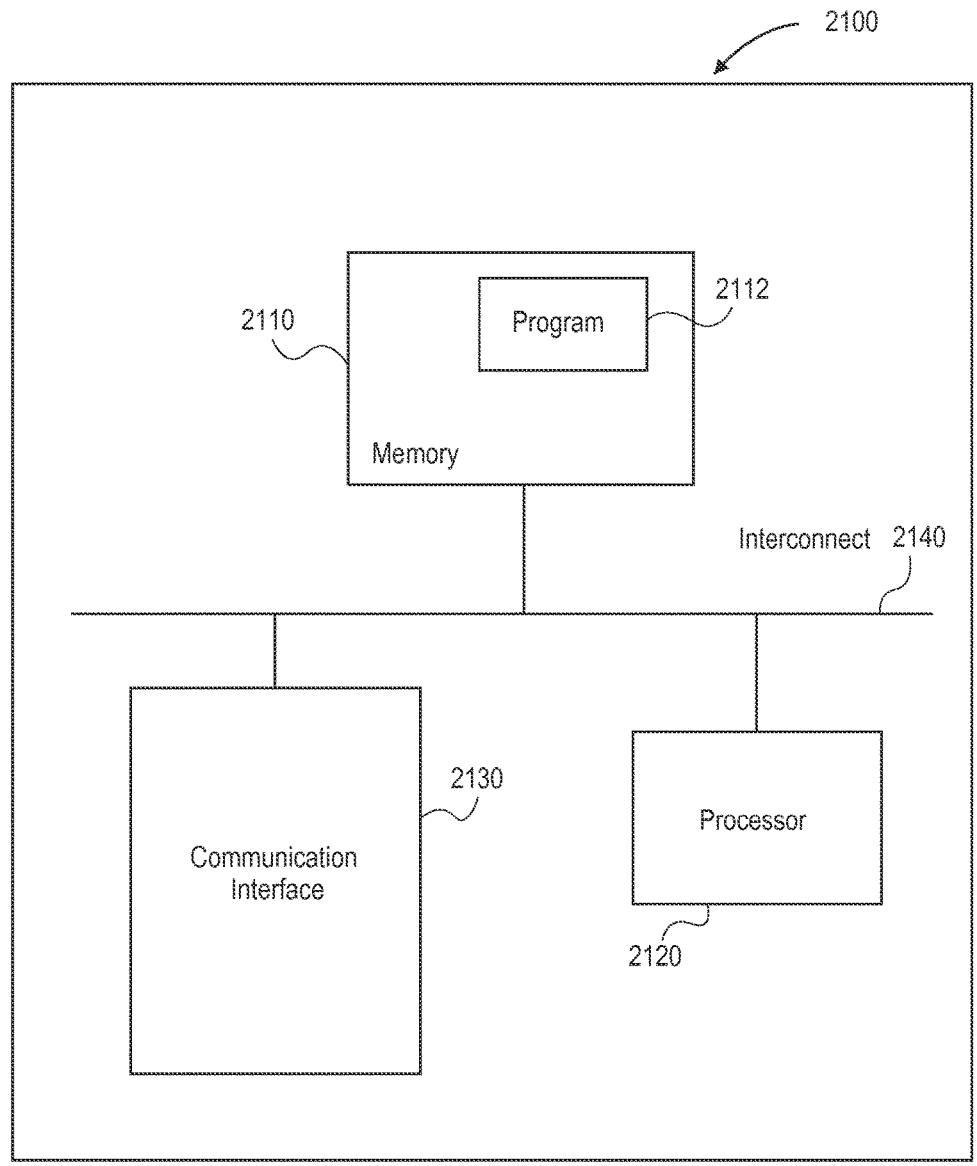
FIG. 21 is a block diagram of components of a computing apparatus or system in which various embodiments may be implemented or that may be utilized to execute embodiments.

FIG. 21 generally illustrates components of a computing device 2100 that may be utilized to execute embodiments and that includes a memory 2110, account processing program instructions 2112, a processor or controller 2120 to execute account processing program instructions 2112, a network or communications interface 2130, e.g., for communications with a network or interconnect 2140 between such components. The memory 2110 may be or include one or more of cache, RAM, ROM, SRAM, DRAM, RDRAM, EEPROM and other types of volatile or non-volatile memory capable of storing data. The processor unit 2120 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2140 may include a system bus, LDT, PCI, ISA, or other types of buses, and the communications or network interface may, for example, be an Ethernet interface, a Frame Relay interface, or other interface. The network interface 2130 may be configured to enable a system component to communicate with other system components across a network which may be a wireless or various other networks. It should be noted that one or more components of computing device 2100 may be located remotely and accessed via a network. Accordingly, the system configuration provided in FIG. 21 is provided to generally illustrate how embodiments may be configured and implemented.

Method embodiments may also be embodied in, or readable from, a computer program product or article of manufacture comprising a non-transitory computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2120 performs steps or executes program instructions 2112 within memory 2110 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while embodiments are described with reference to a particular example of a tax document in the form of Form W-2, the image processor and guidance module may be used to process various other types of documents. Thus, during preparation of an electronic tax return, guidance may be provided to the user for one or multiple different types of tax documents.

Further, it will be understood that sources of tax document images may be a current or prior user, or an originator of the tax document such as an employer or financial institution. Moreover, tax document image processing and comparisons may be performed for tax documents of a current year, or for a prior year (e.g., to allow for guidance during preparation of amended tax returns or tax returns for prior tax years, or if a tax document format has not changed compared to a prior year).

Additionally, embodiments may involve redacting or sanitizing tax document images before a user prepares an electronic tax return, or in response to user input during preparation of the electronic tax return. Further, all tax data may be redacted (e.g., by default), or a user or source of tax document image can select which data to redact such as personal information including name, address, social security number, employee number, etc.

Further, while certain embodiments have been described with reference to displaying an entire tax document image, either in its original form or redacted form, or a selected portion thereof, embodiments may also provide a zooming function through the input device, e.g., by use of a scroll wheel after the image or portion thereof is displayed to the user to zoom in and out of the displayed image.

Moreover, it will be understood that embodiments may be implemented within or executed by a desktop or on-line version of a tax preparation application, e.g., by transmitting a tax document template or portion thereof from the intermediate or host computer to the user's computer via a browser using HTTPS and JavaScript Object Notation (JSON) for data communication, organization and retrieval. Embodiments may also be implemented using a native or downloadable application executable on a mobile communication device such as a smartphone or tablet computing or communication device.

Further, while embodiments have been described with reference to processing images of tax documents for purposes of preparing an electronic tax return utilizing a tax preparation application, embodiments may also be utilized with or executed by other financial management systems to image and process images of other types of documents. For example, other embodiments may involve other financial management systems utilized to analyze images of financial documents containing account and/or transaction data in connection with management of personal finances of the user of the financial management system, e.g., as part of MINT or QUICKEN financial management systems.

Further, while embodiments have been described with reference to collection of tax document images or template images from one or more sources, embodiments may involve collection and processing of images from various numbers and types of sources including from the current or other users for a prior tax year, from the current or other users for a current tax year, from third party sources such as employers and financial institutions.

While certain embodiments have been described with reference to method steps performed in an exemplary order, it will be understood that various steps may be performed in different orders and/or concurrently. Flow diagrams are provided as non-limiting examples of how embodiments may be implemented.

Accordingly, embodiments are intended to exemplify alternatives, modifications, and equivalents that may fall within the scope of the claims.

What is claimed is:

1. A computer-implemented method for transforming a user interface generated by a computerized tax return preparation application comprising instructions executed by a computing apparatus during preparation of an electronic tax return, the method comprising:
   the computing apparatus, by execution of a guidance module utilized by the computerized tax return preparation application and during preparation of electronic tax return of a second user different from a first user:
      receiving a first image of a first tax document, the first image comprising tax data of a first user of the computerized tax return preparation application,
      transforming the first image into a first template of the first tax document by redacting tax data of the first user from the first image,
      cropping, by execution of the guidance module utilized by the computerized tax return preparation application the first template into a plurality of template portions,
      storing the plurality of template portions to a data store, and
      mapping respective template portions to respective portions of respective interview screens of the computerized tax return preparation application; and:
      detecting selection by the second user of a first interface element of an interview screen generated by the computerized tax return preparation application and presented to the second user through a display of a computing device utilized by the second user, and
      in response to detecting selection of the first interface element by the second user, the computing apparatus, by execution of the guidance module:
         accessing the data store,
         selecting a first template portion based at least in part upon the mapping, and
         presenting the selected first template portion through the interview screen generated by the computerized tax return preparation application and the display of the computing device utilized by the second user.

2. The computer-implemented method of claim 1, the first interface element comprising a fillable field of the first interview screen.

3. The computer-implemented method of claim 1, the first interface element being selected by the second user manipulating a computer mouse of the computing device to position a pointer generated by the computer mouse over the first interface element or to click on the first interface element.

4. The computer-implemented method of claim 1, the first image of the first tax document comprising an image of a printed tax document of the first user.

5. The computer-implemented method of claim 1, further comprising the computing apparatus receiving the first image from a mobile communication device of the first user, wherein a camera component of the mobile communication device captured the first image of the first tax document during use of the computerized tax return preparation application by the first user utilizing the mobile communication device.

6. The computer-implemented method of claim 1, further comprising the computing apparatus, by execution of the guidance module:
   receiving a second image of the first tax document, the second image comprising tax data of a third user of the computerized tax return preparation application;
   performing a comparison involving the first image and the second image;
   selecting the second image based at least in part upon the comparison,
   processing the second image by transforming the second image into a second template, wherein transforming the second image comprises redacting tax data of the third user from the second image,
   cropping the second template into a plurality of second template portions,
   storing the plurality of second template portions to the data store,
   mapping respective second template portions to respective portions of respective interview screens of the computerized tax return preparation application,
   in response to detecting selection of the first interface element a second time by the second user, the computing apparatus, by execution of the guidance module:
      accessing the data store,
      selecting a second template portion based at least in part upon the mapping involving respective second template portions, and
      presenting the selected second template portion through the interview screen generated by the computerized tax return preparation application and the display of the computing device utilized by the second user.

7. The computer-implemented method of claim 6, further comprising the computing apparatus, by execution of the guidance module:
   detecting selection of the first interface element by a fourth user of the computerized tax return preparation application, wherein the fourth user is different from the first user, the second user and the third user; and
   in response to detecting selection of the first interface element by the fourth user, the computing apparatus, by execution of the guidance module:
      accessing the data store,
      selecting a second template portion based at least in part upon the mapping, and
      presenting the selected second template portion through the interview screen generated by the computerized tax return preparation application and the display of the computing device utilized by the fourth user.

8. The computer-implemented method of claim 6, performing the comparison comprising the computing apparatus, by execution of the guidance module, comparing an image attribute of the first image and the image attribute of the second image to each other or relative to a pre-determined threshold.

9. The computer-implemented method of claim 8, wherein the image attribute is image brightness, contrast or noise.

10. The computer-implemented method of claim 9, performing the comparison comprising the computing apparatus, by execution of the guidance module, comparing respective histogram data of respective first and second images.

11. The computer-implemented method of claim 9, performing the comparison comprising the computing apparatus, by execution of the guidance module, comparing respective alignment or skew data of respective first and second images.

12. The computer-implemented method of claim 1, redacting the first tax data from the first image comprising the computing apparatus, by execution of the guidance module:
  performing a recognition process to identify tax data of the first user within the first image of the first tax document; and
  deleting or masking identified tax data of the first user from the first image to generate the first template.

13. The computer-implemented method of claim 1, the computing apparatus, by execution of the guidance module, redacting tax data of the first user in response to the second user selecting the first interface element.

14. The computer-implemented method of claim 1, the selected first template portion comprising a single field within the first template, the single field being associated with the first interface element.

15. The computer-implemented method of claim 1, the selected first template portion comprising a plurality of fields including a first field of the first template associated with the first interface element and a second field of the first template located adjacent to the first field of the first template.

16. The computer implemented method of claim 1, further comprising the computing apparatus, by execution of the guidance module:
  receiving a second request by the second user, the second request being based at least in part upon the second user selecting a second interface element of the first interview screen;
  presenting a second portion of the first template to the second user in response to the second request.

17. The method of claim 1, further comprising the computing apparatus, by execution of the computerized tax return preparation application:
  receiving tax data of a tax document of the second user; and
  populating a field associated with the selected first interface element with the received tax data.

18. The method of claim 17, the computing apparatus, by execution of the computerized tax return preparation application, receiving data manually entered by the second user into the field associated with the selected first interface element after the selected first template portion has been presented to the second user.

19. The method of claim 18, further comprising the computing apparatus, by execution of the computerized tax return preparation application:
  completing the electronic tax return; and
  electronically filing the completed electronic tax return with a computer of a tax authority.

20. The method of claim 1, wherein the selected first template portion overlays at least a portion of the displayed interview screen comprising the first interface element.

21. The method of claim 20, wherein the selected first template portion does not overlay the selected first interface element and overlays a plurality of fields of the interview screen comprising the first interface element.

22. The method of claim 1, further comprising the computing apparatus, by execution of the guidance module:
  receiving or determining template identification data; and
  selecting the first template from a plurality of templates in the data store based at least in part upon the identification data, wherein the selected first template portion is selected for presentation to the second user.

23. The method of claim 22, further comprising the computing apparatus, by execution of the guidance module, presenting a request for the template identification data from the second user through the computerized tax return preparation application, the template identification data being received by the guidance module from the second user in response to the request.

24. The method of claim 22, the template identification data being determined by the guidance module from a populated field within the first interview screen or the electronic tax return.

25. The computer implemented method of claim 1, the computerized tax return preparation application comprising an online tax return preparation application accessible by a browser executing on the computing device of the second user.

26. The computer-implemented method of claim 1, wherein the first user's first tax document is a tax document for a current tax year, and the second user is utilizing the computerized tax return preparation application to prepare an electronic tax return for the current tax year.

27. The computer-implemented method of claim 1, wherein the first image is a jpeg image or an image of a .pdf document.

28. The computer-implemented method of claim 1, the selected first template portion comprising a plurality of fields including a first field of the first template associated with the first interface element and at least two other fields located adjacent to the first field of the first template.

29. The computer-implemented method of claim 1, the computing apparatus, by execution of the guidance module, presenting the selected first template portion in response to selection of the first interface element by the second user to enhance:
  the interview screen generated by the computerized tax return preparation application and presented to the second user through the display, and
  computer-based tax document guidance during preparation of the electronic tax return by the second user.

* * * * *